United States Patent
Riggs et al.

(10) Patent No.: US 10,599,623 B2
(45) Date of Patent: *Mar. 24, 2020

(54) MATCHING MULTIDIMENSIONAL PROJECTIONS OF FUNCTIONAL SPACE

(71) Applicant: Locus LP, New York, NY (US)

(72) Inventors: Rory Riggs, New York, NY (US); Elizabeth Bowling, New York, NY (US); Barry Fox, New York, NY (US); Daniel Goldman, New York, NY (US); Zachary Hall, Seattle, WA (US); Jordan Johnson, Seattle, WA (US); Elizabeth Prior, New York, NY (US); Sean Sandys, Seattle, WA (US); Dylan Wengert, Seattle, WA (US)

(73) Assignee: Locus LP, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,303

(22) Filed: Aug. 15, 2019

(65) Prior Publication Data
US 2019/0370231 A1 Dec. 5, 2019

Related U.S. Application Data

(60) Continuation-in-part of application No. 16/000,519, filed on Jun. 5, 2018, now Pat. No. 10,402,379, which
(Continued)

(51) Int. Cl.
*G06F 16/21* (2019.01)
*G06F 16/23* (2019.01)
(Continued)

(52) U.S. Cl.
CPC .......... *G06F 16/21* (2019.01); *G06F 16/2358* (2019.01); *G06F 16/2379* (2019.01);
(Continued)

(58) Field of Classification Search
CPC .... G06F 16/21; G06F 16/248; G06F 16/2379; G06F 16/9024; G06F 16/287;
(Continued)

(56) References Cited

U.S. PATENT DOCUMENTS 7,009,610 B1    3/2006 Keeley
8,368,640 B2    2/2013 Dardinski et al.
(Continued)

OTHER PUBLICATIONS

International Preliminary Report on Patentability in PCT/US2017/027819, dated Oct. 16, 2018, 9 pages.
(Continued)

*Primary Examiner* — Jorge A Casanova

(57) ABSTRACT

The invention includes an algorithmic method for dynamically computing complex relationships among objects of an underlying functional system. The invention includes a method to algorithmically determine a set of functional locations in n-dimensional functional space of a set of elements of a functional system by electronically representing a set of data entities in a database system, the database system comprising a logical data model for structuring data sets from which functional information can be derived, using the logical data model to associate a set of characteristics with a reference point in the functional information system, selecting a functional positioning algorithm, and wherein the functional positioning algorithm executes a set of steps that takes as input a set of characteristics and returns as output a set of locations in n-dimensional functional space.

25 Claims, 6 Drawing Sheets

Related U.S. Application Data is a continuation of application No. 15/488,433, filed on Apr. 14, 2017, now Pat. No. 9,990,380, which is a continuation-in-part of application No. 14/967,313, filed on Dec. 13, 2015, now Pat. No. 9,910,910, which is a continuation of application No. 14/802,543, filed on Jul. 17, 2015, now Pat. No. 9,361,358, which is a continuation of application No. 14/604,272, filed on Jan. 23, 2015, now Pat. No. 9,098,564, which is a division of application No. 14/216,936, filed on Mar. 17, 2014, now Pat. No. 8,990,268.

(60) Provisional application No. 61/802,245, filed on Mar. 15, 2013, provisional application No. 61/801,959, filed on Mar. 15, 2013, provisional application No. 62/322,740, filed on Apr. 14, 2016.

(51) Int. Cl.
*G06F 16/2458* (2019.01)
*G06F 16/248* (2019.01)
*G06F 16/28* (2019.01)
*G06F 16/29* (2019.01)
*G06F 16/901* (2019.01)
*G06F 16/9535* (2019.01)
*G06Q 30/02* (2012.01)
*G06Q 40/06* (2012.01)

(52) U.S. Cl.
CPC ........ *G06F 16/248* (2019.01); *G06F 16/2458* (2019.01); *G06F 16/287* (2019.01); *G06F 16/29* (2019.01); *G06F 16/9024* (2019.01); *G06F 16/9535* (2019.01); *G06Q 30/02* (2013.01); *G06Q 40/06* (2013.01)

(58) Field of Classification Search
CPC .. G06F 16/2458; G06F 16/2358; G06F 16/29; G06F 16/9535; G06Q 30/02; G06Q 40/06
See application file for complete search history.

(56) References Cited

U.S. PATENT DOCUMENTS

| | | | |
|---|---|---|---|
| 8,417,477 B2 | 4/2013 | Miguelanez et al. | |
| 8,990,268 B2 | 3/2015 | Riggs | |
| 9,535,878 B1 | 1/2017 | Brinkmann et al. | |
| 9,990,380 B2 | 6/2018 | Riggs et al. | |
| 2002/0010651 A1 | 1/2002 | Cohn et al. | |
| 2004/0003132 A1 | 1/2004 | Stanley et al. | |
| 2004/0030741 A1 | 2/2004 | Wolton et al. | |
| 2004/0068564 A1 | 4/2004 | Snoddy et al. | |
| 2004/0090472 A1 | 5/2004 | Risch et al. | |
| 2004/0225638 A1 | 11/2004 | Geiselhart et al. | |
| 2006/0010058 A1 | 1/2006 | D'Hers et al. | |
| 2006/0015857 A1 | 1/2006 | Gold et al. | |
| 2006/0136259 A1 | 6/2006 | Weiner et al. | |
| 2006/0274070 A1 | 12/2006 | Herman et al. | |
| 2007/0112714 A1 | 5/2007 | Fairweather | |
| 2008/0072139 A1 | 3/2008 | Salinas et al. | |
| 2009/0292514 A1 | 11/2009 | McKim et al. | |
| 2009/0313370 A1 | 12/2009 | Rhoads | |
| 2009/0319058 A1 | 12/2009 | Rovaglio et al. | |
| 2010/0241698 A1 | 9/2010 | Hillerbrand | |
| 2010/0257028 A1 | 10/2010 | Hillerbrand | |
| 2010/0332474 A1 | 12/2010 | Birdwell et al. | |
| 2011/0179165 A1 | 7/2011 | Ravichandran | |
| 2011/0202334 A1 | 8/2011 | Abir | |
| 2011/0307478 A1 | 12/2011 | Pinckney et al. | |
| 2012/0047113 A1 | 2/2012 | Weinberger et al. | |
| 2012/0066217 A1 | 3/2012 | Eder | |
| 2012/0278244 A1 | 11/2012 | Lee et al. | |
| 2013/0212060 A1 | 8/2013 | Crouse et al. | |
| 2013/0218474 A1 | 8/2013 | Longo | |
| 2013/0325472 A1 | 12/2013 | Rachevsky et al. | |
| 2014/0079297 A1 | 3/2014 | Tadayon et al. | |
| 2014/0180972 A1 | 6/2014 | Boldyrev et al. | |
| 2014/0258032 A1 | 9/2014 | Psota et al. | |
| 2016/0004335 A1 | 1/2016 | Hosenpud | |

OTHER PUBLICATIONS

Abstract of "Constraint-based attribute reduction in rough set analysis", Tuan-Fang Fan et al., published in: 2010 IEEE International Conference on Systems, Man and Cybernetics, date of conference: Oct. 10-13, 2010, 2 pages.

Anonymous, "Nearest neighbor search", Wikipedia, Sep. 5, 2014, retrieved from the Internet https://en.wikipedia.org/w/index.php?title=Nearest_neighbor_search&oldid=624243877 on Apr. 4, 2019, 7 pages.

International Search Report in PCT/US2017/027819, dated Jun. 30, 2017, 4 pages.

Written Opinion of the International Searching Authority in PCT/US2017/027819, dated Jun. 30, 2017, 8 pages.

MATCHING MULTIDIMENSIONAL PROJECTIONS OF FUNCTIONAL SPACE

CROSS-REFERENCE TO RELATED APPLICATIONS

This application is a continuation-in-part of application Ser. No. 16/000,519, filed Jun. 5, 2018, which is a continuation of application Ser. No. 15/488,433, filed Apr. 14, 2017, now U.S. Pat. No. 9,990,380, which is a continuation-in-part of application Ser. No. 14/967,313, filed Dec. 13, 2015, now U.S. Pat. No. 9,910,910 which is a continuation of application Ser. No. 14/802,543, filed Jul. 17, 2015, now U.S. Pat. No. 9,361,358, which is a continuation of application Ser. No. 14/604,272, filed Jan. 23, 2015, now U.S. Pat. No. 9,098,564, which is a divisional of application Ser. No. 14/216,936, filed Mar. 17, 2014, now U.S. Pat. No. 8,990,268, which claims the benefit of U.S. Provisional Application No. 61/802,245, filed Mar. 15, 2013, and U.S. Provisional Application No. 61/801,959, filed Mar. 15, 2013, the contents of all of which are herein incorporated by reference in their entirety. This application also claims the benefit of U.S. Provisional Application No. 62/322,740, filed Apr. 14, 2016, the contents of which are herein incorporated by reference in its entirety.

FIELD OF THE INVENTION

The invention relates to an algorithmic method for dynamically computing complex relationships among elements of an underlying functional system.

BACKGROUND OF THE INVENTION

The analysis of complex systems, including the search and navigation of large data sets associated with, for example, biological, chemical, mechanical, physical, political, and economic systems, is challenging without an underlying functional model. Representations of these systems and their constituent subsystems frequently have been derived inductively or in an ad hoc fashion, and often are irreconcilable with one another.

The lack of ontological consistency, expressiveness, and interoperability of these representations inhibits the capacity to characterize phenomena associated with complex systems, to predict their behavior accurately, to develop normative models of their outcomes, and to search complex functional data.

In existing search and navigation systems, search results are displayed as independent categories; any successive iteration utilizes metrics gathered through user-generated search and browsing history as well as ad hoc content categorization systems derived from observation of phenomena.

When data is organized in coordinate format geographically or temporally, it is significantly easier to use for the purposes of query, navigation, and action. Other data management domains lack prior art methods for establishing such an underlying standardized coordinate model. Applications and search tools derived from prior art methods are frequently most effective when applied towards short-term individualized requests with clear geographic and temporal aspects, such as restaurant delivery, current celebrity information, and taxi retrieval services. For substantive issues related to complex systems, such as environmental, economic, and political systems, the lack of a structured syntax for organizing the underlying qualitative information leaves associated search and recommendation systems vulnerable to misinformation and provides little to no mechanism for users to engineer and improve the underlying systems or understand relationships between the parts and the whole.

Current machine learning techniques that seek to model phenomena regarding complex systems frequently suffer from the curse of dimensionality, a result of a nonsystematic approach to generating a representative space in which there is frequently no reason ex ante for any relationships among dimensions and correlations among them are likely to be random.

A machine learning application usually begins by asking a question. As a generalized example, one might want to classify a group of data into a set of groups, such as categorizing the content of a video through descriptive tags, and determining whether a patient has a disease given particular test results or is exposed to a health risk given a set of test results. Often in these classification use cases, the categories to which the applications are predicting do not have any a priori proximity relationship with each other. As a result, when comparing prediction results from such tests, machine learning applications that rely on error-prone classification systems can fall short. In such cases, while one can identify which data were classified incorrectly and the confidence of the prediction, it is impossible to tell the machine how far off the classification was, only that it was wrong. The predictions and evaluations of predictions lack adequate notions of proximity in the outputs and the assessments of those outputs.

The techniques are often highly opaque even to those who design, implement, and use them, often rendering it virtually impossible to audit or verify their results until they have already impacted the underlying system. The techniques also generally require extremely large data sets to attain an acceptable level of accuracy, which tends to decline significantly when phenomena in a test set diverge even modestly from those of a training set, a common challenge when dealing with information about complex systems.

BRIEF SUMMARY OF THE INVENTION

According to an embodiment of the invention for a method for using a computing environment to algorithmically determine proximity among elements of underlying functional systems represented in n-dimensional space, the method comprises: electronically representing a set of data entities in a database system, the data entities representing elements of the underlying functional system, and the database system comprising a logical data model for structuring data sets from which functional information can be derived; wherein the logical data model comprises at least two fields ordered by a set of interrelationships among at least two elements in the underlying functional system; and the interrelationships correspond to the functional properties of a process converting a set of input elements to a set of output elements; electronically assigning tags to the data entities, the tags representing functional properties of the elements represented by the data entities in a functional information system, wherein the functional information system defines reference points in an n-dimensional space for the data entities according to the set of interrelationships among the elements of the underlying functional system; selecting a type of functional proximity and an algorithm based on the type, wherein functional proximity measures correspondence among a set of reference points, and a functional proximity algorithm defines executable steps for computation of the correspondence based on the magnitude and category of relationships among a plurality of the data entities; executing the functional proximity algorithm on a data set comprising a subset of the data entities in the database to generate a set of functional proximity results; and storing the result of the selected functional proximity algorithm.

According to an alternative or additional embodiment, the method further comprises: defining a functional vicinity with respect to a reference point, wherein the functional vicinity comprises a subset or region of n-dimensional space around the reference point; electronically searching the database system to identify a subset of data entities within the functional vicinity of a defined reference point; retrieving the subset of data entities within the vicinity of the first reference point; associating a property with the functional vicinity, wherein the property may be derived from shared properties of the members of the vicinity; and inferring a property associated with a selected reference point based on its membership in a functional vicinity.

According to an alternative or additional embodiment, the reference point corresponds to a biological process and the functional vicinity corresponds to related morphological and physiological systems, further comprising using the data related to the functional vicinity for prognostic purposes.

According to an alternative or additional embodiment, the method further comprises using a navigation algorithm to improve a statistical outcome in a biological system, and using a set of parameters as inputs to select a target set of reference points for a biological process from the subset.

According to an alternative or additional embodiment, the method further comprises recommending a set of edits to a gene sequence to modify trait expression levels.

According to an alternative or additional embodiment, for an untagged data entity, assessing the probability of membership in the vicinity by comparing the properties associated with the vicinity with those associated with the untagged data entity; and incorporating probability of membership in multiple vicinities into a prediction of precise functional location for the untagged data entity.

According to an alternative or additional embodiment, the method further comprises: defining m non-functional attributes of the data entities; electronically representing the data entities in an m-dimensional space, wherein the m dimensions correspond to the m non-functional attributes; forming an n+m dimensional space as the cartesian product of the n-dimensional functional space and the m-dimensional non-functional space; extending the functional proximity algorithm defined on the n-dimensional space to a proximity algorithm defined on the n+m-dimensional space.

According to an alternative or additional embodiment, the method further comprises iteratively scoring and ranking data entities associated with elements in the functional system based on the quantity and quality of direct and indirect relationships codified in functional space.

According to an alternative or additional embodiment, the method further comprises constructing at least one normative reference graph and at least one test graph by assigning nodes to data entities and edges to the interrelationships; visually representing the graphs in the n-dimensional space projected into a set of coordinate planes; using statistical analysis of a population associated with the functional system to determine normative outcomes; performing comparative analytics for diagnostic purposes between the reference graph and the test graph to consider potential modifications to the underlying system corresponding to the test graph.

According to an alternative or additional embodiment, the method further comprises delineating a functional trajectory over time by electronically representing a set of paths through functional locations in the n-dimensional space to infer an outcome in the underlying functional system, as verifiable through a test of statistical significance.

According to an alternative or additional embodiment, the method further comprises assigning an n-dimensional array of n-dimensional tensors to the data entities, wherein the assignment of n-dimensional tensors organizes k tensors in n-dimensional space based on the functional properties of the elements with respect to a set of variables within the functional system; using the result of the functional proximity algorithm as an input to a matrix of the output of the feature values of dimension$\leq m^2 \times k^2$; wherein the matrix comprises a set of results of the functional proximity algorithm among a plurality of tensors.

According to an alternative or additional embodiment, the method further comprises electronically using a machine learning process to construct a probability space based on the matrix for the assignment of positions in n-dimensional space to an l-dimensional array of j tensors; outputting results comprising a results matrix of dimension$\leq l \times n$; wherein the set of entries of the results matrix probabilistically organize the l tensors in n-dimensional space based on the predictions of the machine learning technique of the functional properties of the elements with respect to a variable within the functional system.

According to an embodiment of the invention for a system for using a computing environment for algorithmically determining proximity among elements of underlying functional systems represented in n-dimensional space, the method comprising, the system comprises: a computer processor configured for: electronically representing a set of data entities in a database system, the data entities representing elements of the underlying functional system, and the database system comprising a logical data model for structuring data sets from which functional information can be derived; wherein the logical data model comprises at least two fields ordered by a set of interrelationships among at least two elements in the underlying functional system; and the interrelationships correspond to the functional properties of a process converting a set of input elements to a set of output elements; electronically assigning tags to the data entities, the tags representing functional properties of the elements represented by the data entities in a functional information system, wherein the functional information system defines reference points in an n-dimensional space for the data entities according to the set of interrelationships among the elements of the underlying functional system; selecting a type of functional proximity and an algorithm based on the type, wherein functional proximity measures correspondence among a set of reference points, and a functional proximity algorithm defines executable steps for computation of the correspondence based on the magnitude and category of relationships among a plurality of the data entities; and executing the functional proximity algorithm on a data set comprising a subset of the data entities in the database to generate a set of functional proximity results; and a data store configured for storing the result of the selected functional proximity algorithm.

According to an alternative or additional embodiment, the computer processor is further configured for: defining a functional vicinity with respect to a reference point, wherein the functional vicinity comprises a subset or region of n-dimensional space around the reference point; electronically searching the database system to identify a subset of data entities within the functional vicinity of a defined reference point; retrieving the subset of data entities within the vicinity of the first reference point; associating a property with the functional vicinity, wherein the property may be derived from shared properties of the members of the vicinity; and inferring a property associated with a selected reference point based on its membership in a functional vicinity.

According to an alternative or additional embodiment, the reference point corresponds to a biological process and the functional vicinity corresponds to related morphological and physiological systems, further comprising using the data related to the functional vicinity for prognostic purposes.

According to an alternative or additional embodiment, the computer processor is further configured for using a navigation algorithm to improve a statistical outcome in a biological system, and using a set of parameters as inputs to select a target set of reference points for a biological process from the subset.

According to an alternative or additional embodiment, the computer processor is further configured for recommending a set of edits to a gene sequence to modify trait expression levels.

According to an alternative or additional embodiment, the computer processor is further configured for: for an untagged data entity, assessing the probability of membership in the vicinity by comparing the properties associated with the vicinity with those associated with the untagged data entity; and incorporating probability of membership in multiple vicinities into a prediction of precise functional location for the untagged data entity.

According to an alternative or additional embodiment, the computer processor is further configured for: defining m non-functional attributes of the data entities; electronically representing the data entities in an m-dimensional space, wherein the m dimensions correspond to the m non-functional attributes; forming an n+m dimensional space as the cartesian product of the n-dimensional functional space and the m-dimensional non-functional space; extending the functional proximity algorithm defined on the n-dimensional space to a proximity algorithm defined on the n+m-dimensional space.

According to an alternative or additional embodiment, the computer processor is further configured for iteratively scoring and ranking data entities associated with elements in the functional system based on the quantity and quality of direct and indirect relationships codified in functional space.

According to an alternative or additional embodiment, the computer processor is further configured for: constructing at least one normative reference graph and at least one test graph by assigning nodes to data entities and edges to the interrelationships;
visually representing the graphs in the n-dimensional space projected into a set of coordinate planes; using statistical analysis of a population associated with the functional system to determine normative outcomes; performing comparative analytics for diagnostic purposes between the reference graph and the test graph to consider potential modifications to the underlying system corresponding to the test graph.

According to an alternative or additional embodiment, the computer processor is further configured for: delineating a functional trajectory over time by electronically representing a set of paths through functional locations in the n-dimensional space to infer an outcome in the underlying functional system, as verifiable through a test of statistical significance.

According to an alternative or additional embodiment, the computer processor is further configured for: assigning an r-dimensional array of n-dimensional tensors to the data entities, wherein the assignment of n-dimensional tensors organizes k tensors in n-dimensional space based on the functional properties of the elements with respect to a set of variables within the functional system; using the result of the functional proximity algorithm as an input to a matrix of the output of the feature values of dimension$\leq m^2 \times k^2$; wherein the matrix comprises a set of results of the functional proximity algorithm among a plurality of tensors.

According to an alternative or additional embodiment, the computer processor is further configured for: electronically using a machine learning process to construct a probability space based on the matrix for the assignment of positions in n-dimensional space to an l-dimensional array of j tensors; outputting results comprising a results matrix of dimension$\leq l \times n$; wherein the set of entries of the results matrix probabilistically organize the l tensors in n-dimensional space based on the predictions of the machine learning technique of the functional properties of the elements with respect to a variable within the functional system.

According to an embodiment of the invention for a method for using a computing environment to algorithmically determine a set of functional locations in n-dimensional functional space of a set of elements of a functional system, the method comprises: electronically representing a set of data entities in a database system, the data entities representing elements of the underlying functional system, and the database system comprising a logical data model for structuring data sets from which functional information can be derived; wherein the logical data model comprises at least two fields ordered by a set of interrelationships among at least two elements in the underlying functional system; and the interrelationships correspond to the functional properties of a process converting a set of input elements to a set of output elements; electronically assigning tags to the data entities, the tags representing characteristics of the elements, wherein the characteristics are functional and non-functional properties of the elements represented by the data entities in a functional information system, wherein: the functional information system defines a set of reference points in an n-dimensional functional space for the data entities, data for which functional referents can be assigned, and associated nonfunctional data according to the set of interrelationships among the elements of the underlying functional system; electronically selecting a set of characteristics of the elements as an input; electronically using the logical data model to associate the set of characteristics with a reference point in the functional information system; selecting a functional positioning algorithm, wherein the functional positioning algorithm executes a set of steps that takes as input a set of characteristics and returns as output a set of locations in n-dimensional functional space; electronically storing the output of the functional positioning algorithm.

According to an alternative or additional embodiment, the functional positioning algorithm returns a probability distribution over the n-dimensional functional space, and wherein the characteristics are qualitative or quantitative properties, connections, or derivatives thereof, that are functional or non-functional, further comprising: using a machine learning model to derive the probability distribution over the n-dimensional functional space, wherein the machine learning model uses the reference points as feature sets to statistically assign a set of possible locations for a characteristic; and using the set of possible locations to statistically assign a set of characteristics to the reference points.

According to an alternative or additional embodiment, the method further comprises, for an untagged data entity, assessing the probability of membership in the vicinity by comparing the properties associated with the vicinity with those associated with the untagged data entity; and incorporating probability of membership in multiple vicinities into a prediction of precise functional location for the untagged data entity.

According to an alternative or additional embodiment, the method further comprises transforming a set of divergent systems of non-functional data to a logical data model representing a unified n-dimensional functional space; and performing an analytical process on the n-dimensional functional space to provide an output response to a query regarding an outcome in an underlying system.

According to an alternative or additional embodiment, the method further comprises defining a functional vicinity with respect to a reference point, wherein the functional vicinity comprises a subset or region of n-dimensional space around the reference point; electronically searching the database system to identify a subset of data entities within the functional vicinity of a defined reference point; retrieving the subset of data entities within the vicinity of the first reference point; associating a property with the functional vicinity, wherein the property may be derived from shared properties of the members of the vicinity; and inferring a property associated with a selected reference point based on its membership in a functional vicinity.

According to an alternative or additional embodiment, the system further comprises: a communication system in which a set of functionally identified users form a network; and users of the system can search and navigate through the user base to locate and communicate with other users of interest based on functional identity; and the system manager entity providing tools to facilitate user interaction and curating information for users based upon functional identity, comprising data, products, and other entities of interest to the user; the user self-updating identity, comprising functional and non-functional information, to refine search, navigation, communication, and curated results; and the system manager entity dynamically updating the users' functional identities based upon user behavior and defining a set of vicinities of interest for the users based on a selected functional proximity algorithm, to refine search, navigation, communication, and curated results.

DETAILED DESCRIPTION OF THE INVENTION

Figure 1:
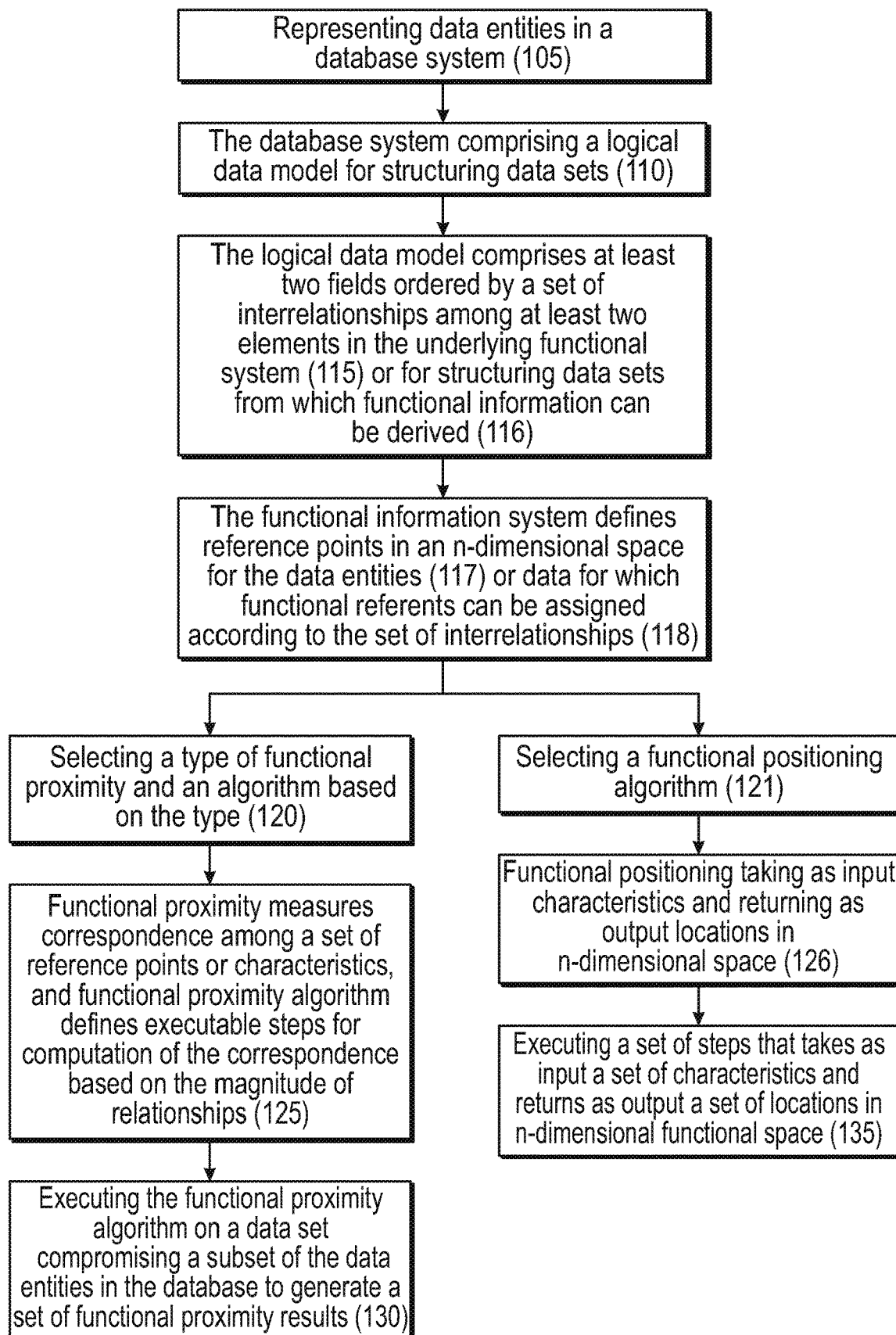
FIG. 1 illustrates an overview of an example method.

In the following description of embodiments, reference is made to the accompanying drawings that form a part hereof, and which show by way of illustration specific embodiments of the claimed subject matter. It is to be understood that other embodiments can be used and that changes or alterations, such as structural changes, can be made.

Such embodiments, changes, or alterations are not necessarily departures from the scope with respect to the intended claimed subject matter. While the steps below can be presented in a certain order, in some cases the ordering can be changed so that certain inputs are provided at different times or in a different order without changing the function of the systems and methods described.

The procedures described below could also be executed in different orders. Additionally, various steps that are described below need not be performed in the order disclosed, and other embodiments using alternative orderings of the steps could be readily implemented. In addition to being reordered, the steps could be decomposed into sub-computations.

As characterized herein, a user can take any form, such as an individual, organization, computerized process such as a bot or automated process. As used herein, variable names may be repeated in different sections, although not necessarily referring to the same named referent elsewhere.

In some embodiments, a language is constructed or selected. As non-limiting examples, the language can be formal, symbolic, artificial, controlled, natural, or some combination thereof.

Functional Information

In some embodiments, a transformation t can be defined as a process converting a set I of input elements to a set O of output elements. Functional systems comprise a set T of transformations, sets I and O, as well as the requisite bodies and phenomena that catalyze, facilitate, and accomplish those processes.

A functional system can be modeled as logically structured information associated with transformations or input-output processes comprising a set of elements, as well as associated entities, processes, relationships, and their attributes and values. In natural language, these can correspond to lexical categories of nouns, verbs, adpositions and conjunctions, adjectives and adverbs, and numbers. In some embodiments, symbols can be assigned to the elements and organized in accordance with an order in the underlying functional system. The symbols can characterize elements that can be derived from more fundamental assumptions. The identification of these assumptions can facilitate the synthesis of methods for characterizing the functional system, enhancing the connectivity of elements, the management of exposures, and the flexibility of models across domains.

In some embodiments, function can be unified with other properties already easily rendered in coordinate space, including, as non-limiting examples, space, time, color, sound, light, current, and heat, as well as measures of information and value, enabling visual, aural, and spatial expression and transmission of functional information across domains, for applications including, but not limited to, search and navigation of information about complex systems.

As a non-limiting example, color can be assigned a set of lexical units corresponding to its order on the spectrum. In some embodiments, proximate colors can equate to proximate functions. As non-limiting examples, colors can comprise sequential markers, relational tags, relational coordinates, sequential values with a point of reference, syntactic coordinates, or a representation of a functional syntax.

In some embodiments, the combination of symbols representing functional information constitutes an expression, which can be represented by a metatag. A syntax can be constructed which enables the evaluation of the validity of expressions as well as the generation of new expressions.

Syntactic tags can be assigned in a database to symbols and fields in expressions as well as to underlying elements of the functional system, enabling applications in search, retrieval, visualization, recommendation systems, and descriptive and predictive analytics, as well as facilitating and enabling interactions among elements of the functional system. Functional information can be associated with data entities representing elements of the underlying functional system using a logical data model, as described below.

FIG. 1 illustrates an overview of an example method according to the invention. The method can include representing data entities in a database system (105), the database system comprising a logical data model for structuring data sets (110), the logical data model comprises at least two fields ordered by a set of interrelationships among at least two elements in the underlying functional system (115) or for structuring data sets from which functional information can be derived (116), the functional information system defines reference points in an n-dimensional space for the data entities (117) or data for which functional referents can be assigned, and associated nonfunctional data according to the set of interrelationships (118), selecting a type of functional proximity and an algorithm based on the type (120), functional proximity measures correspondence among a set of reference points, and a functional proximity algorithm defines executable steps for computation of the correspondence based on the magnitude of relationships among a plurality of the data entities (125), and executing the functional proximity algorithm on a data set comprising a subset of the data entities in the database to generate a set of functional proximity results (130) or executing a set of steps that takes as input a set of characteristics and returns as output a set of locations in n-dimensional functional space (135).

Logical Data Models and Syntactic Unification in Functional Information Systems

A logical data model can be defined for functional information that specifies the elements of the underlying functional system and their interrelationships. In some embodiments, the logical data can comprise at least two fields ordered by a set of interrelationships among at least two elements in the underlying system, wherein the interrelationships correspond to the functional properties of a process converting a set of input elements into a set of output elements. In some embodiments, the logical data model can be represented in a computing environment as a layer of operations on a database of functional information in the form of a functional information system.

The structure of a functional information system can be designed to reflect the underlying relationships present in the referent or underlying functional system in order to improve a user's capacity to search, index, discover, and create functional and non-functional information. In certain embodiments, the logical data model, or subsets thereof, can be used to create feature sets for machine learning techniques, as described further below.

In some embodiments, functional information is tagged and organized using a standardized set of fields which can provide units for one or more functions represented in n-dimensional functional space. The standardized set of fields can be discrete or continuous. Once structured, functional information can be associated with other types of information organized by analogous systems of interval measurement, including, as non-limiting examples, standardized systems for measuring and representing geographic and temporal information.

Figure 2:
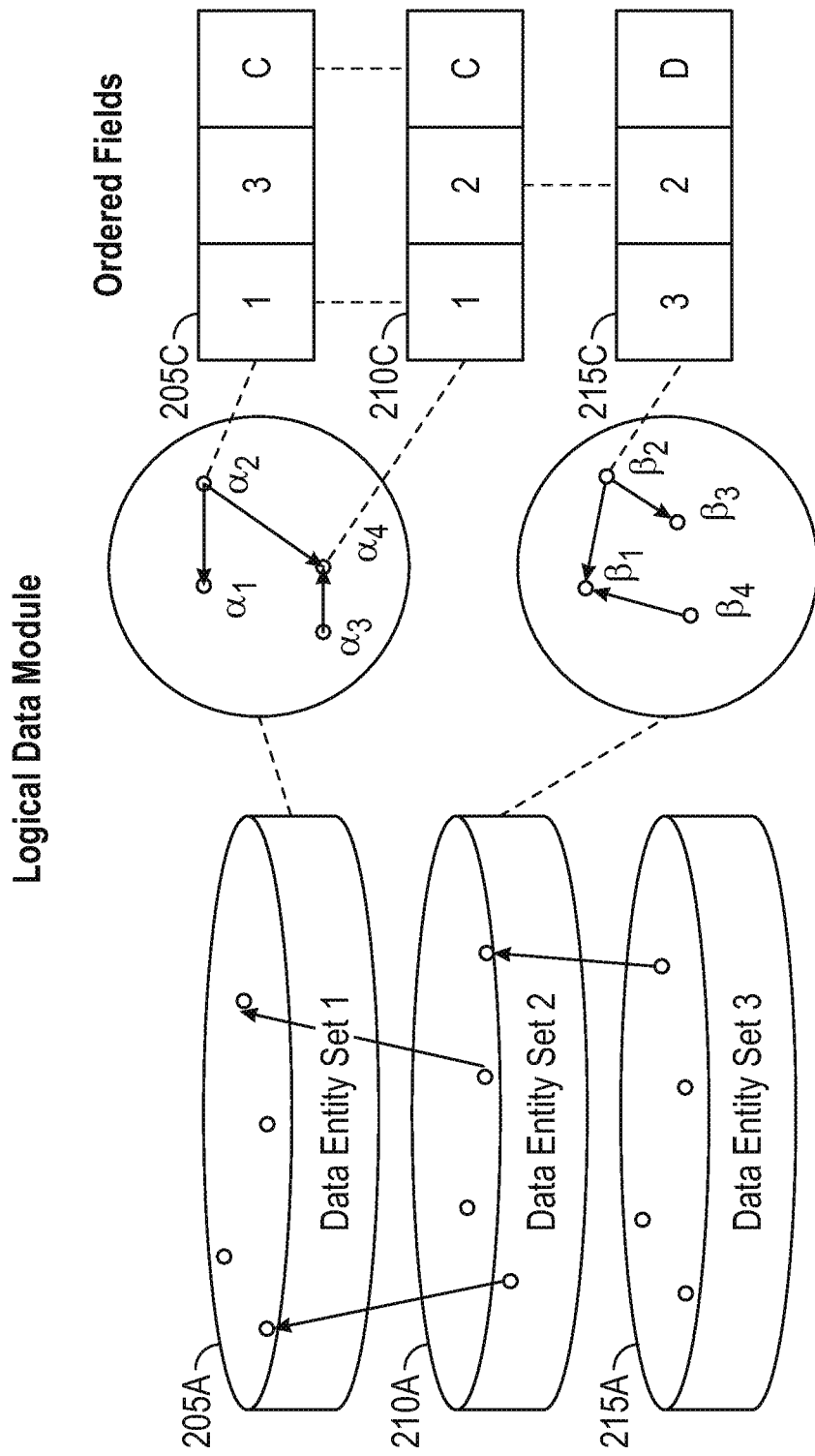
FIG. 2 illustrates an example logical data model.

FIG. 2 illustrates an example logical data model according to the invention. The logical data model comprises ordered fields (205C, 210C, 215C) defined by underlying interrelationships among real-world systems. Classes may be subclasses of other classes, for example, if one represents the sub-systems of another. Between levels of classes, relationships between fields are captured as well. Arrows between 205C, 210C, and 215C represent correspondences between fields in each layer, dotted lines show identity. 205A, 210A, and 215A illustrate the data entities of classes 205C, 210C, and 215C, respectively. Fields set 205C, element "1" is functionally proximate to Fields set 210C, element "1", which correspondence is also illustrated between 205A and 210A.

Figure 3:
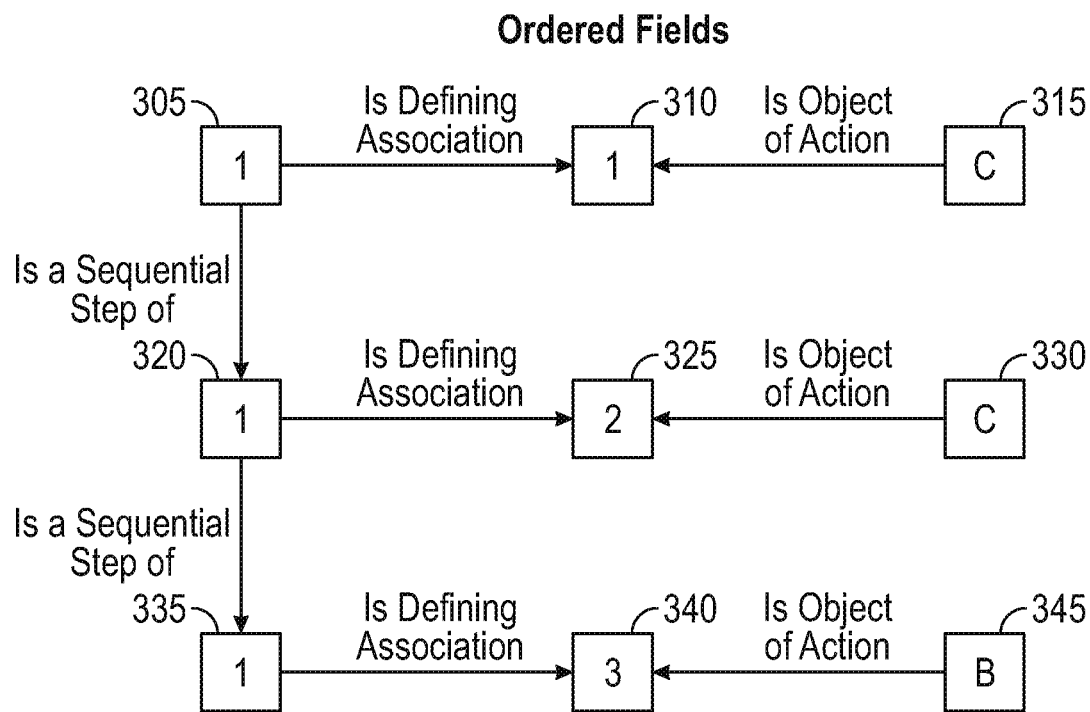
FIG. 3 illustrates an example ordered set of fields showing example relationships among fields.

FIG. 3 illustrates an example ordered set of fields showing example relationships between the fields according to the invention. Field 305 ("1") is a defining association of Field 310 ("1"), which jointly describe an action performed upon an object described in Field 315 ("C"). Fields 320 and 325 ("1" and "2" respectively) describe a sequential step of the action described in Fields 305 and 310, and describe an action performed upon an object described in Field 330 ("C"). Field 335 ("1") is a sequential step of Field 320 ("1"), and is a defining association of Field 340 ("3"), which jointly describe an action performed upon an object described in Field 345 ("B"). As discussed herein, a functional proximity algorithm can be configured to compute correspondence based on the magnitude and category of relationships among a plurality of the data entities, such as that between Field 325 and Field 315, or Field 325 and Field 305.

Figure 4:
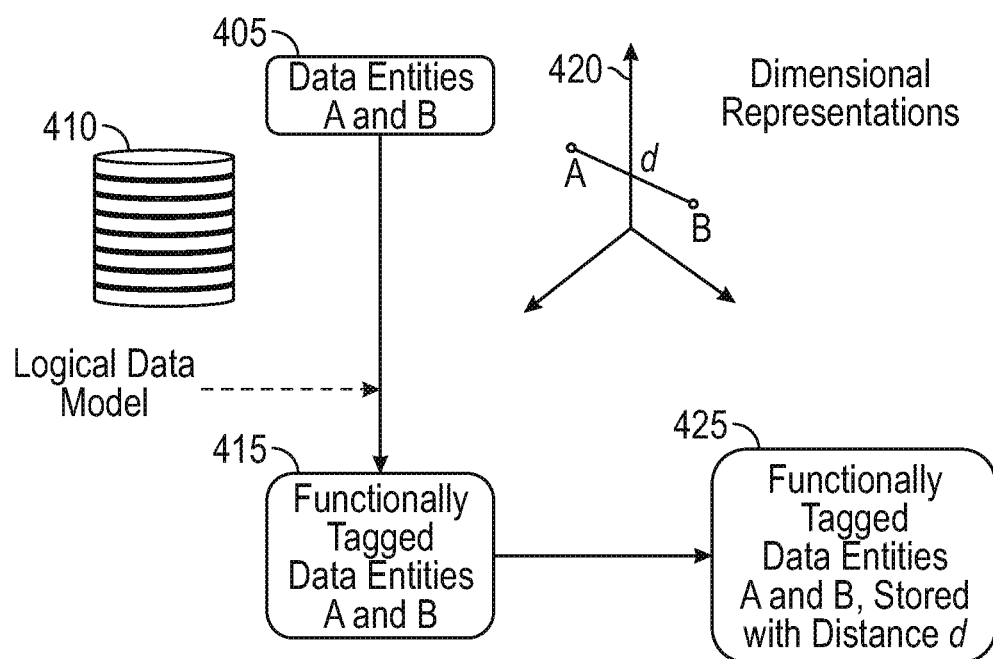
FIG. 4 illustrates an example tagging and dimensional representation of data entities.

FIG. 4 illustrates an example tagging and dimensional representation of data entities. As illustrated, data entities A and B (405) are represented in a logical data model (410), functionally tagged (415), and stored with a distance d that has been calculated (425). As discussed herein, the distance calculation may be made based on the magnitude and category of relationships among a plurality of the data entities. As illustrated, the entities "A" and "B" can be represented in three-dimensional functional space (420), having functional distance "d".

Logical Data Model Unification

Without loss of generality, the unification of, as non-limiting examples, vectors, codes, strings, sequences, or tensors using these structures can be represented, in certain embodiments, as $\{x_{11}, x_{1n}\} \cup \{y_{11}, y_{1n}\} \rightarrow \{x_{11}' \ldots x_{1n}', y_{11}' \ldots y_{1n}'\}$. This can be extended to the unification of matrices and to the unification of an arbitrary number of arbitrary large or disparate sets of, as non-limiting examples, vectors, codes strings, sequences, or tensors. In certain embodiments, the methodologies described herein can facilitate the representation of this data in a graph format in which a subset of the matrix corresponds to nodes and another subset corresponds to edges. As a non-limiting example, the resultant interoperability and reduction in surface area of the space can increase the speed of computation, as determined by a test of statistical significance.

Associating functional information that is structured to reflect interrelationships among elements with information from other domains that is also structured to reflect interrelationships among elements provides users enhanced search and navigation capabilities by enabling cross-comparative reorientation and pivot functionalities and increases the granularity in architectural indexing and search functionalities. Standardizing the representation of functional systems in a natural space facilitates applications that utilize the representation to find, relate, and create information about sub- and super-systems relative to the original referent functional system. The unification of structured information that reflects interrelationships across domains and unstructured information can facilitate composite views of the data including, as a non-limiting example, through computer-mediated simulations.

Set Theoretical Representation of Logical Data Model Fields

Loci can be constructed by combining tags or metatags; as a non-limiting example, a locus can comprise the tuple (a, $\gamma$, $\lambda$, r, s, $\upsilon$). In other embodiments, a locus can comprise the tuple (a, $\gamma$, r, s). In other embodiments, a locus can comprise the tuple $(r_1, s_1, \upsilon_1, a, \gamma, \lambda, r_2, s_2, \upsilon_2)$. In other embodiments, there can be no inherent order within a locus.

In some embodiments, when the system is functional, inputs, outputs, and functions can be modeled as (a, $\gamma$)

$(r_1, s_1) \rightarrow (r_2, s_2)$.

In other embodiments, which include substaging, the inputs, outputs, and functions can be modeled as (a, $\gamma$, $\lambda$)

$(r_1, s_1, \upsilon_1) \rightarrow (r_2, s_2, v_2)$.

A field or level can be comprised of one or more loci; in some embodiments, the loci comprising a field or level can be ordered by proximity relative to a reference point. As non-limiting examples, the proximity can be functional, morphological, physiological, anatomical, physical, semantic, temporal, lexical, geographic, positional, syntactic, or some combination thereof. In some embodiments, the loci can be ordered, in part or in whole, with respect to the proximity of their referents in the functional system.

As a non-limiting example, a field can characterize one or more nodes in a graphical representation of the functional system. In some embodiments, a barcode can comprise one or more fields. In some embodiments, the tags, functions, inputs, outputs elements, or loci represented or included in a field, level, or barcode will be more homogeneous than an arbitrarily large random sample from the database, as validated by a statistical test.

The lexical categories, tags, and metatags can be used, as non-limiting examples, to construct data structures such as loci, fields, levels, barcodes, stratified or segmented lexical architectures, or some combination thereof. In some embodiments, a first lexical category R, comprising lexical units $r_{1, 2 \ldots n}$, is selected, and a plurality of the lexical units are electronically tagged with lexical category stages S= $a_{1, 2 \ldots m}$, wherein S$\varepsilon \mathbb{P}$(R). A second lexical category A, comprising lexical units $a_{1, 2 \ldots o}$, is selected, and a plurality of the lexical units are electronically tagged with lexical category stages $\Gamma = \gamma_{1, 2 \ldots p}$, wherein $\Gamma \varepsilon \mathbb{P}$(A). In some embodiments, an arbitrary number of further lexical categories can be assigned.

In some embodiments, electronic tags or metatags representing lexical category substages $Y=\sigma_{1, 2, \ldots q}$ are then assigned to a plurality of lexical units in S, wherein Y$\varepsilon \mathbb{P}$(S). Electronic tags or metatags representing lexical category substages $\Lambda = \lambda_{1, 2 \ldots v}$, are then assigned to a plurality of lexical units in $\Gamma$, wherein $\Lambda \varepsilon \mathbb{P}$(Y). In some embodiments, an arbitrary number of further substages can be $\mathbb{P}$ assigned.

In some embodiments, the logical data model described herein may correspond to the lexical architecture. The logical data model can be used, in some embodiments, in conjunction with a syntax or system syntax, that can, as non-limiting examples, be applied by a computer processor to generate or evaluate linguistic expressions by iterating through the database to relate or assess a plurality of lexical categories, category stages, lexical units, tags, or combinations thereof. In some embodiments, the expressions can include loci that facilitate, as non-limiting examples, the temporal, spatial, mechanical, physical, biological, ecological, economic, financial, political, anatomical, morphological, or morphosyntactic modeling of the system.

In some embodiments, the logical data model can facilitate visual comparative analytics by electronically iterating through the database to assign one or more colors, shapes, scales, or shades to a plurality of lexical categories, category stages, or lexical units. In some embodiments the tags, expressions, lexical architectures, fields, levels, barcodes, or loci will facilitate computer-enabled modeling of systems with analytical tools that can be demonstrated to increase descriptive, retrodictive, or predictive accuracy of the behavior of systems, subsystems, or elements using a test of statistical significance.

Set Theoretical Representation of Expressions

In some embodiments, a computerized representation of a system S is stored comprising elements $E=\{e_1, \ldots e_n\}$, and a set of subsets $B=\{\varepsilon_1, \ldots, \varepsilon_n\}$ wherein each $\varepsilon_i \subset E$, wherein a plurality of $\varepsilon \in B$ have characteristic properties $p_i \in P$, with $p_i: B \rightarrow A_i$, and the elements of $A_i$ are related inputs, outputs, or operations of the $\varepsilon_i$'s.

As a non-limiting example, a set of expressions X is constructed, wherein each $x_m \in X$ is comprised of a combination of two or more elements $\varepsilon_i$ sharing a property $a_i \varepsilon A_i$, such that $\forall x_i \in X$, $\exists \varepsilon \in B$ such that $\varepsilon_i$ is in $x_i$.

A population Z can be stored with data entities $D=\{d_n\}$ wherein Z is comprised of subpopulations $z_{1, 2 \ldots v}$, with each $z_v$ having a set of data entities $$\Delta \subset D, \bigcup_1^k \Delta_o = D,$$

with attributes A. As non-limiting examples, $f: S \rightarrow Z$, $g: E \rightarrow D$, and $h: P \rightarrow A$ can be bijective, injective, or neither. The collection of subpopulations $z_{1, 2 \ldots v}$ can determine the structure of Z.

In some embodiments, a set of composites C can be constructed, wherein each $c_u \in C$ is comprised of a combination of two or more data entities $\Delta_o$ sharing an attribute $a_w \in A_i$ for some i, $\exists z_v: c_u \supset z_v \in Z$. As non-limiting examples, $e: X \rightarrow C$ can be bijective, injective, or neither.

As a non-limiting example, a set of numerical or categorical values will be associated with two or more subpopulations and two or more composites, which can be associated with a set of statistical properties, such as correlation or covariance. The subpopulations and composites will be ordered, as a non-limiting example, based on a set of statistical tests associated with the statistical properties and numerical values.

Stratified or Segmented Lexical Architectures

The lexical categories and category stages can comprise, in some embodiments, a stratified lexical architecture. In some embodiments, the stratified lexical architecture will include substages. A subset of the stratified lexical architecture can comprise a segment in some embodiments. A segment can include, as a non-limiting example, a stage and two substages.

In some embodiments, a system comprises a set of elements, which can be represented by a set of lexical units. In some embodiments, the system will be functional, wherein a functional system relates the elements according to their roles in a process converting a set of input elements to a set of output elements. In other embodiments, the system will be mechanical, morphological, physical, chemical, aeronautical, biological, ecological, anatomical, syntactic, morphological, morphosyntactic, linguistic, grammatical, political, socioeconomic, economic, financial, monetary, or fiscal.

As non-limiting examples, these lexical units can be represented syntactically, morphologically, semantically, symbolically, formally, mathematically, aurally, visually, as morphemes, words, phrases, clauses, or some combination thereof.

In some embodiments, electronic tags or metatags representing lexical categories are assigned to the lexical units; as non-limiting examples, these tags or metatags can be semantic, syntactic, symbolic, written, visual, aural, tactile, or some combination thereof. As non-limiting examples, the lexical categories can be nouns, verbs, adjectives, pronouns, adverbs, adpositions, or conjunctions.

A database representation of a stratified or segmented lexical architecture, can, as a non-limiting example, enable a computer processor to cluster data entities based on their semantic, syntactic, or symbolic relationships.

Overview: Locations in a Logical Data Model

A functional system has a set of functional locations in the underlying system as well as its representation in graph and coordinate space, as described further below. Functional location or region have, as non-limiting examples, relative positions; associated qualitative properties, and associated quantitative properties, which may be functional or non-functional. A computer can match a location with information associated with a specific location. A computer can also use information in a functional information system associated with a data entity to assign a functional location to the specific functional data entity.

The identification and assignment of locations enables the calculation of functional proximities, which indicate, as non-limiting examples, the similarity among the locations and the magnitude of relationships among the elements and their representations. The capacity to determine functional proximity enables the definition of functional regions or vicinities around a reference point in functional space. Functional locations relative to any given location and functional proximities can be determined using a functional proximity algorithm, described below. This algorithm can, as non-limiting examples, determine relative distances, and associate relative qualitative and quantitative characteristics.

Figure 5:
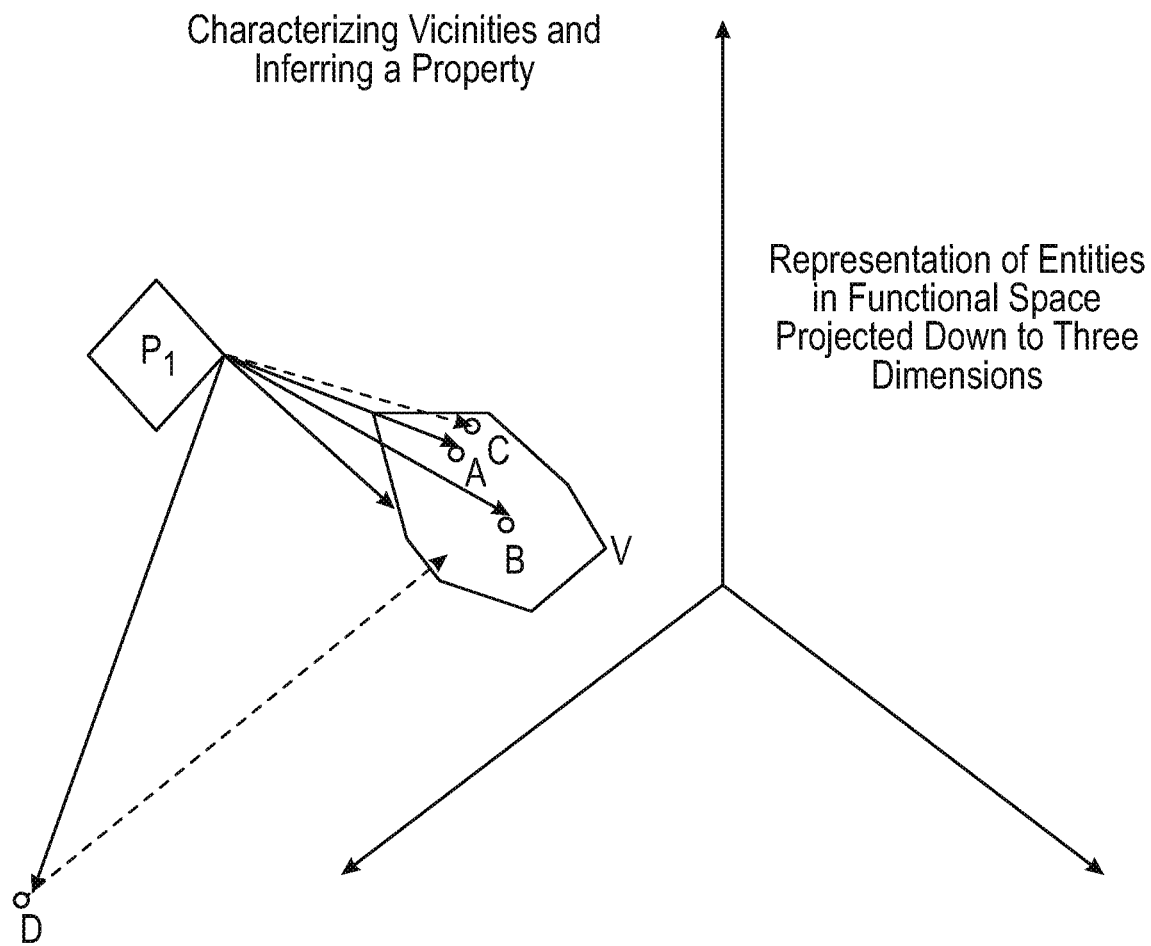
FIG. 5 illustrates an example method for characterizing vicinities and inferring properties.

FIG. 5 illustrates an example method for characterizing vicinities and inferring properties according to the invention. Given entities A and B within a vicinity V, each are known to bear the property P1. Entities within vicinity V bear property P1, and thus property P1 is associated to vicinity V. Entity C, which is within vicinity V, is not known to have or not have property P1. Through C's membership in V, the property P1 can be inferred for entity C. Given entity D which bears property P1, has not yet been located within functional space. By examining this property against the properties of the vicinity V, entity D's location may be inferred to be in vicinity V.

Figure 6:
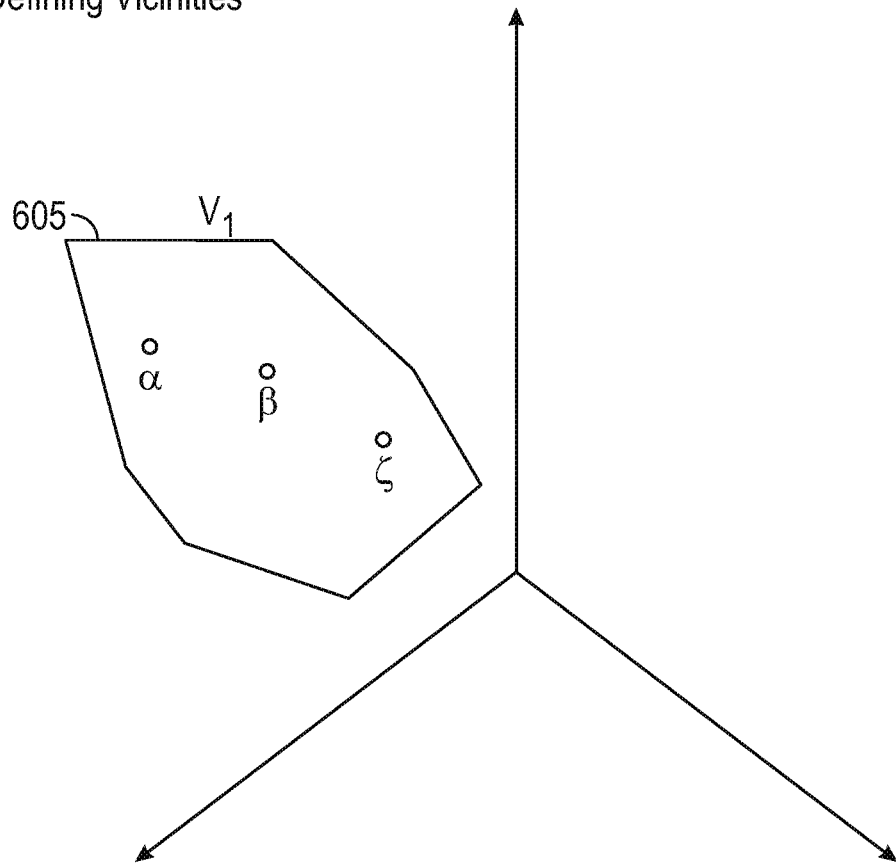
FIG. 6 illustrates an example of a defined vicinity comprising reference entities.

FIG. 6 illustrates an example of a defined vicinity (605), comprising reference entities α, β, and ζ, as a representation of a vicinity in three-dimensional functional space. Vicinity 605 can comprise an arbitrary number of vicinities.

Figure 7:
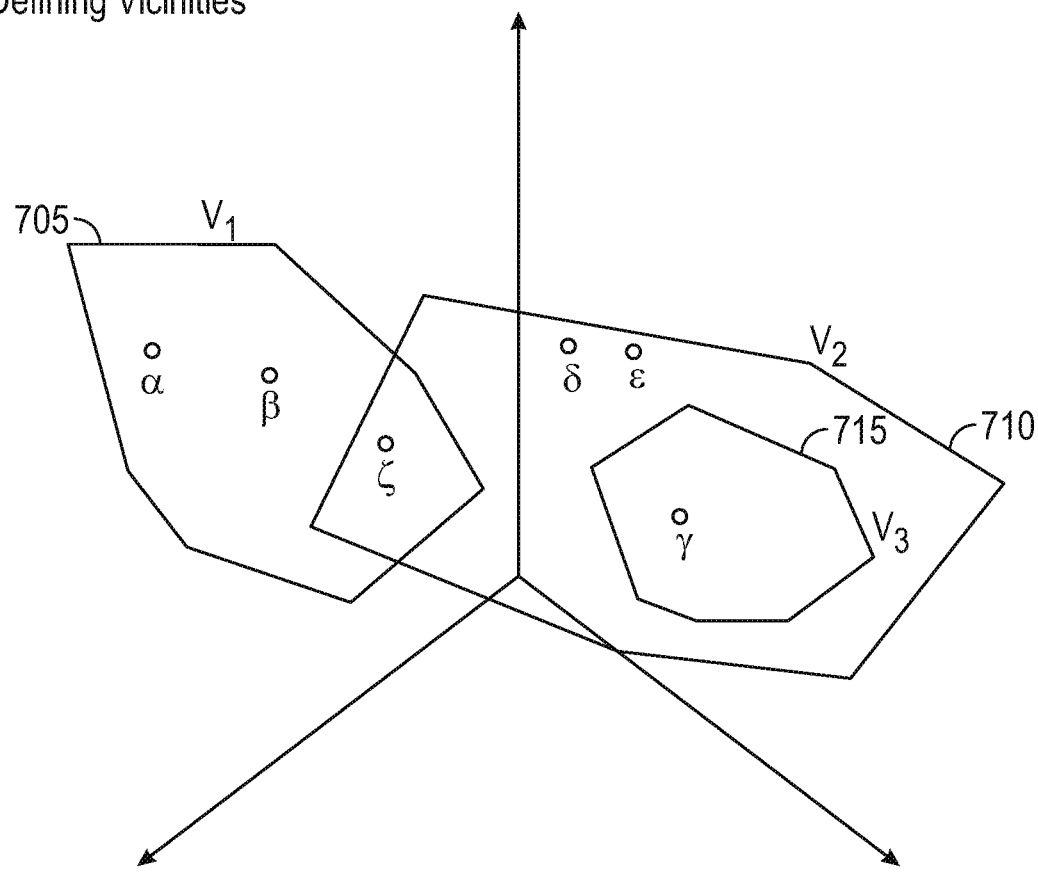
FIG. 7 illustrates an example representation of vicinities defined in three-dimensional functional space.

FIG. 7 illustrates an example representation of vicinities defined in three-dimensional functional space. As illustrated, each vicinity 705, 710, and 715 can comprise an arbitrary number of entities. Vicinities may be overlapping (705 and 710), non-overlapping (705 and 715), or wholly bounded within other vicinities (as 715 is bounded within 710).

Coordinate Representations

The capacity of a logical data model to syntactically integrate representations of functional systems facilitates computation in an arbitrary number of dimensions that preserve the structure of the underlying functional system and which can be verified through a test of statistical significance. As a non-limiting example, the symbols can be represented as variables, which can be discrete or continuous. As a non-limiting example, each symbol can be mapped in a dimension in coordinate space, specifically a functional coordinate space, with the dimension characterizing any subset of the underlying functional system. In some embodiments, the coordinates can be projected down to a lower level of dimensionality, or a subset of coordinate space can be selected, and can be represented in a grid. The coordinates can be represented in an arbitrary number of dimensions. Positions can be fixed or changing in some or all dimensions.

When the subset of the underlying functional system mapped in a dimension is cyclical, polar coordinates can be analytically useful. In other embodiments, other orthogonal coordinate representations, including, as non-limiting examples, spherical, cylindrical, or affine representations, can be beneficial. In other embodiments, non-orthogonal coordinate systems and representations can be analytically useful.

Clustering and weighting algorithms can be used to increase the predictability, normality, or stability of outcomes related to elements of the functional system; the high-dimensional representations enabled by the methodology described herein can be particularly suited to achieving these objectives for large population sets.

Coordinate Representations: Natural Language-Independence

Coordinate-based tagging systems are natural language-independent, but individual tags can be applied to select natural language terms that can be associated with a specific coordinate-based location by fixing and standardizing their semantic meaning. The interoperability of functional coordinates and natural language enable the system to link disparate types of information concerning complex systems. In some embodiments, users can fix any value of the coordinate system to a defined level of granularity and compare results by varying other values.

The interoperability of functional coordinates and natural language further enables the system to predict or retrodict connections, links, or associations within and across functional systems based on one or more associated links or connections. The capacity to fix values to an arbitrary or user-specified level of granularity can enable inter-level predictions or retrodictions by using one or more links, connections, or associations on one level to predict or retrodict links, connections, or associations on another level.

In some embodiments, divergent systems of non-functional data, including as non-limiting examples legacy databases and categorical classification systems, may be assigned functional coordinates through a semantic and syntactic association process.

N-Dimensional Representations

In certain embodiments, a representation of a functional system can be rendered in an arbitrary number of dimensions. As a non-limiting example, each element of a logical data model can be associated with a dimension, wherein the dimension characterizes any subset of the underlying functional system. In some embodiments, all dimensions have a measurable relationship with all other dimensions, and are linearly independent; in other embodiments, some dimensions have a measurable relationship with some other dimensions, and are linearly dependent. In some embodiments, a single dimension may be used to define a reference point within n-dimensional space; in other embodiments, multiple dimensions may be used. Dimensions with direction and value can comprise a vector subspace of the representation.

In some embodiments, unlocking the dimensionality of relations among objects in a functional system, aligning it with the inherent dimensionality of existing domain-specific representations as well as coordinate and measurement systems organizing both functional and non-functional information, and unifying the representation into a single coordinate system can be used as an approach to uniting domain-specific characterizations of elements, integrating syntactic data management techniques, and improving ranking and scoring measures, thereby enhancing the modeling of systems as well as the computer-aided design and synthesis of subsystems. In some embodiments, certain dimensions may be selected as representative; in other embodiments, a dimensionality reduction algorithm can be used for analytical purposes. As a non-limiting example, a representation of a functional system in n-dimensional space and sub-regions of the representation can be defined as a reference point and used as inputs to and outputs from functional algorithms.

Graph Representations

In certain embodiments, a representation of a logical data model may be rendered graphically. As a non-limiting example, tags or metatags derived from the logical data model can be associated with elements of the underlying functional system, the tags and metatags representing nodes and edges in the graph representation of the system. As a non-limiting example, data entities can be assigned nodes and interrelationships can be assigned edges, while processes, attributes, and values can be assigned to either. In certain embodiments, sets of nodes and edges can aggregate into individual nodes, while nodes can be disaggregated into sets of nodes and edges.

As a non-limiting example, a set of lexical category stages or substages can represent entities or processes whose sequence in the lexicon represents their order in the underlying system. In certain embodiments, these successive stages or substages can be assigned nodes. As a non-limiting example, a set of lexical category stages or substages, or lexical units can represent processes or relationships in the underlying system, which can be assigned edges, as described further below.

In some embodiments, a graph can be presented to a user, as non-limiting examples, with functional, syntactic, symbolic, coordinate, visual, aural, audiovisual, mathematical, linguistic, geographic, or temporal representations of data, enabling the user, as non-limiting examples, to sort, store, retrieve, query, visualize, or analyze the system, or some combination thereof. As a non-limiting example, a graphical representation of a functional system and sub-regions of the representation can be defined as a reference point and used as inputs to and outputs from functional algorithms.

In some embodiments, graph representations of functional systems can be projected onto a set of coordinate planes, and analytics can be run on at least two graph representations that measure and compare the relative structure and outcomes of the functional systems. The output of comparative analysis may be used, as non-limiting example, for a prognosis or diagnosis of the underlying functional systems; the outputs may also be used to suggest changes to the underlying functional system to achieve a normative or desired outcome.

In some embodiments, a set of tags or metatags can constitute a string. As non-limiting examples, a systems syntax can enable the generation or evaluation of combinations of strings. As a non-limiting example, the algorithmic identification of string sequences can enable the generation of graphs of subsystems that can be connected at scale through the syntax governing relationships. In some embodiments, a set of nodes or edges can be associated with a top-level domain for website architecture, as described in more detail below.

Functional Algorithms

Using the methods described herein, qualitative, quantitative, functional, syntactic, and non-functional information can be associated with elements of a logical data model in a functional information system. A functional system may be represented, as non-limiting examples, using lexical architecture, set theoretical notation, coordinate systems, and n-dimensional and graph structures.

Functional algorithms can be used to locate and relate entities within representations of functional systems. As non-limiting examples, functional algorithms can be used to calculate or compute position, distance, space selection, vector, and closeness. In some embodiments, the computation of functional algorithms enables, as non-limiting examples, enhanced storage, visualization, search, retrieval, and analytical applications for large data sets associated with functional systems.

In representations of functional systems, there are, as non-limiting examples, two classes of algorithms that are important in the functionality of the underlying information system: functional positioning algorithms and functional proximity algorithms. As a non-limiting example, a functional positioning algorithm represents the set of steps that take information inputs associated with an untagged data entity in order to identify and tag the data entity's functional location, thereby mapping it onto functional space. As a non-limiting example, a functional proximity algorithm represents the set of steps that take a tagged data entity and its functional location, and provides a set of measures on its proximity to other functionally located entities within the system, thereby enabling the system to provide information on other entities functionally proximate to the entity. Analogs to these algorithms exist in geographic information systems. The first, a geographic positioning system, represents a set of steps that takes information inputs associated with an unlocated entity and uses those inputs to identify and tag the entity's geographic location, thereby mapping it onto geographic space. The second, a geographic proximity algorithm, represents the set of steps that take a geographically tagged data entity, and provides a set of measure on its its proximity to other geographically located entities, thereby enabling the system to provide information on other entities geographically proximate to the entity.

In databases containing functional system information, it is possible to use functional positioning algorithms to search and find functional locations for elements by inputting qualitative or quantitative information associated with the element.

In databases containing functional system information, it is possible to use the specific functional location of an element to find functionally proximate elements and information using a functional proximity algorithm, such as applications in proximity, vicinity, navigation, and trajectory, as described below.

Functional Positioning Algorithms

In some embodiments, the discovery of the underlying order of a functional system enables the functional system to be mapped and modeled with greater precision and accuracy. A functional algorithm can be constructed to place an entity within a coordinate representation of a functional system.

As a non-limiting example, the discovery of the underlying properties of an entity in the functional coordinate system enables derivation of an entity's location within that system through inference or machine learning methods. As non-limiting examples, an entity's location in functional coordinate space can be inferred from a variety of information, such as its vicinity as described below, its functional proximity to related entities as described below, its associated syntactic or non-functional information that can be correlated to the structure or outcomes of previously defined entities within the system, and other information that can enhance flexibility, connectivity, control, precision, and descriptive and predictive accuracy for numerous applications.

Graded Functional Proximity

As discussed herein, functional proximity indicates relative similarity of functional characteristics and relative location in an underlying functional system. In certain embodiments, graded functional proximity may reflect asymmetry of closeness or divergence of similarity by perspective among entities within an underlying functional system or functional information system, in which directional or empirical factors may influence calculations. As used herein, the term functional proximity shall encompass graded functional proximity. In certain embodiments, functional proximity is a measure of relative closeness among entities defined by a functional coordinate system in the n-dimensional space among a plurality of reference points. In other embodiments, functional proximity measures correspondence among a set of reference points, and a functional proximity algorithm defines executable steps for computation of the correspondence based on the magnitude and category of relationships among a plurality of the data entities.

As discussed herein, syntactic proximity indicates relative similarity of characteristics that are structured in the logical data model according to their order in an underlying functional system. In some embodiments, there exists an intersection among the characteristics associated with functional proximity and syntactic proximity.

In some embodiments, a variety of proximity algorithms, including, as non-limiting examples, functional, non-functional, syntactic, and hybrid, can be computed and then assigned weights, facilitating a determination of overall proximity. A hybrid proximity algorithm, as used herein, can be defined as a computation that delineates similarity of characteristics according to a combination of functional, non-functional, and/or syntactic proximity measures. As non-limiting examples, a computer or user can select a set of proximity measures, weights, or scoring measures.

Functional Proximity: Coordinate Embodiments

Functional coordinates can provide sufficient information about data entities in order to perform functional proximity calculations among them.

In some embodiments, a weighted average similarity scheme can be used between sets of strings, tags, or metatags in which partial matches are considered. As non-limiting examples, the weights to be assigned to portions of the strings, tags, or metatags that can be compared can be predetermined, specified by the system, specified by the user, or some combination thereof.

In some embodiments, a categorical distance measure can be applied to sets of strings, tags, or metatags. As non-limiting examples, the strings, tags, or metatags can be viewed as vectors or scalars, while the measure can be based on the frequency of attributes or values in comparable subsets of the strings, tags, or metatags as a proportion of a whole population being studied. As a non-limiting example, for any two vectors or scalars of strings X, Y, with N entries in the vector, their proximity or weight can be calculated as $$S = \sum_{k=1}^{n} (\delta(X_k, Y_k)(1 - p_{X_k}^2))/N,$$

in which each equation is weighted by the Kronecker Delta function. In some embodiments, matches are only made if attribute $X_k$ is equivalent to attribute $Y_k$.

In other embodiments, a set of metrics can be associated with locations in functional space. As non-limiting examples, the associated metrics can indicate the prevalence or probability of a given entity at a given functional location; the metrics can be rendered, as non-limiting examples, as vectors, tensors, matrices, arrays, metadata appended to graphs or coordinate representations, or some combination thereof.

The data concerning functional locations can, in certain embodiments, be combined with, as non-limiting examples, temporal or geographic data to facilitate comparative analytics. In embodiments including vector and tensor representations, distance algorithms can be applied to determine the functional similarity among, as non-limiting examples, time periods or geographic regions, which can enhance, as non-limiting examples, retrodictive and predictive analytics as well as search and recommendation results.

Functional Proximity: Graph Embodiments

In some embodiments, proximity measures associated with a graph representation of a functional system will enable the identification of clusters centered around medoids, wherein a medoid is a representative point in a dataset that is most similar to other points in the set. As a non-limiting example, medoids can be generated through random walks, which can be simulated, or through a k-nearest neighbors algorithm.

In other embodiments, a structural functional proximity algorithm can be used. A graph-based algorithm will be defined that assesses similarity between data entities based on, as a non-limiting example, empirical connections within the underlying functional system. The graph-based algorithm can, in some embodiments, search for functionally similar replacement nodes when the set of empirical connections represented within the functional information system may be incomplete. As a non-limiting example, functionally similar replacement nodes can be identified through a different functional proximity algorithm.

Functional Proximity: Connectivity Embodiments

In some embodiments, proximity can be derived from the empirical relationships among the entities, which can be aggregated, stored, and assigned to data entities and their referents. These empirical relationships can be weighted, scored, timestamped, or geotagged, and stored in one or more databases as a basis for proximity calculations. In some embodiments, the proximity metrics can be overlaid with, as non-limiting examples, geographic or temporal data for the purposes of search, analysis, or visualization.

In some embodiments, a connectivity-based algorithm can be defined which assesses the shortest path among nodes, repeatedly deletes edges, and recalculates the shortest path after a plurality of deletions. In some embodiments, the connectivity-based algorithm will continue to delete edges until there is only one path, and will compute a connectivity score based on a composite score of shortest paths before and after deletions. In some embodiments, the connectivity score can be considered as part of a proximity algorithm. In some embodiments, the connectivity score can be considered as part of a proximity algorithm. In other embodiments, a position algorithm can be defined which compares a plurality of in and out edges of a plurality of nodes.

Functional Proximity: Adapted Embodiments

As a non-limiting example, the Manhattan distance can be used to derive a functional proximity metric by comparing a set of locations in n-dimensional functional space. In some embodiments, the computerized system will assign a score $s_1$ if the reference point locations are nearby, and a different score $s_2$ if the reference point locations are distant.

In some embodiments, the measures of functional proximity can be combined with measures of proximity for numerical variables in the data set. As non-limiting examples, these measures can be computed using Mahlanobis distance, covariance kernels, or Euclidean distance. In some embodiments, the distance can be calculated after dimension reduction associated with, as a non-limiting example, principal component analysis.

As a non-limiting example, the proximity among clusters can be determined through Jaccard similarity, wherein the Jaccard similarity is the intersection of the clusters divided by their union. In other embodiments, transition probabilities in the random walk can enable a determination of proximity: as a non-limiting example, this can be determined through a transition probability matrix.

In some embodiments, a stationary distribution algorithm can be used to compute functional proximity.

Any of the coordinate, connectivity, graded, vicinity, navigation, trajectory, path, graph or other measures described herein may be used in conjunction or alone to determine functional proximity. Functional proximity algorithms can use these measures to find correspondence among a set of reference points and define a correspondence based on the magnitude and category of relationships among a plurality of the data entities.

Functional Vicinity Algorithms

A functional vicinity can be defined which provides, for any set of functional coordinates, a region or subset of the space based on a first selected reference point and the surrounding area. In some embodiments, functional vicinity can be defined as the subset of entities in n-dimensional space which are located within a threshold functional proximity of a first selected and defined reference point. In such an embodiment, the functional proximity threshold defines a distance within functional proximity space that allows for the inclusion of reference points within the threshold distance and the exclusion of reference points outside of the threshold distance from the first defined reference point.

Functional Navigation Algorithm

In some embodiments, through the establishment of a functional coordinate system and corresponding functional proximities between reference points within that system, a connected network of entities is established. A path travelling along these connections may be constructed as a path to navigate between reference points within the system. In some embodiments, a functional path defines a set magnitude, distance, or route among a series of reference points within the n-dimensional space.

When navigating between a first and second reference point, a multitude of paths can be proposed to reach the second point by selecting different reference points of varying functional proximity. As a non-limiting example, a path can be selected among this set of paths by optimizing among all possible paths by minimizing the functional proximity of the entire path. Thus, the optimization process affects navigation as well as the orientation towards the second reference point, and consequently identifies an efficient or optimized path.

In some embodiments, path optimization may be used to improve a statistical outcome in a biological system, by choosing a path that is biologically efficient.

Functional Trajectory Algorithm

Using paths between reference points, a trajectory can be established over time by representing a set of paths through functional locations in the n-dimensional space to infer an outcome in the underlying functional system, as verifiable through a test of statistical significance. Thus, trajectories can enable the derivation a velocity in functional space by observing movement through time, and can further enable the inference of a future location by observing that trajectory relative to past and present position.

A path travelling along these connections may be constructed as a path to navigate between reference points within the system. In some embodiments, a functional path defines a set magnitude, distance, or route among a series of reference points within the n-dimensional space.

Accuracy Scoring Systems

A scoring system can be defined which provides, for any pair of tags, a score based on a type of proximity to convey the accuracy of assignment. As a non-limiting example, such a type of proximity could include the likelihood that two independent parties considering a particular entity would select either tag to characterize the entity. In such a case, if both tags describe an entity with reasonable accuracy, then their scores can be high. In a case where the tags diverge substantially from each other, then the scores can be low. Types of proximity for the purposes of creating scoring systems can, in some embodiments, be based on other functional proximity algorithms. In other embodiments, they can primarily encode human intuition about semantic similarity within the language described herein.

For scoring systems which provide scores based upon human intuitions of semantic similarity, the resulting metrics can be combined with other proximity metrics to create new composite metrics. Applications include, as non-limiting examples, classifier assessment and functional information system maintenance.

Applications: Functional Search and Navigation

In some embodiments, the techniques described herein can be used to improve the search and navigation of information relating to functional systems more rapidly, efficiently, and precisely than prior methodologies by utilizing functional relationships and functional proximity metrics to relate and display multilayered query results. In some embodiments the techniques may generate novel results, drawing upon functional groupings difficult to capture without functional characterizations.

Key components of search and navigation in functional information systems are functional search algorithms that enable search and navigation functionalities in and around locations or regions of the search space based on functional positions and functional proximity, each informed by the functional information, functional measures, or characteristics associated with the elements of the underlying functional system. Functional positioning algorithms, as described herein, provide information to locate untagged entities in functional space. In functional proximity algorithms, as described herein, each measure or characteristic associated with a specific functional location can further inform the computer about an entity, providing a rich contextualization based upon its functional location. Functional proximity and functional positioning algorithms are important components of search and navigation in functional information systems.

Assisted functional search, in some contexts, can allow users to search and navigate nested functional coordinate-based systems. Users can input a search or navigation entry, including, as non-limiting examples, natural language, sound, coordinate, and visual terms, and receive expected results corresponding to the specific domain and scale of the query performed. In some embodiments, the returned results can include information from other domains and scales, which is related to the original search or navigation entry or search results by functional associations. These functional associations can be absolute, relating to at least one reference point in n-dimensional space, and they can be relative, contextualized to a user's specific functional identity and summation of user-specific functional and non-functional attributes.

Users can navigate through multilayered search or navigation results and representations of functional information by reorienting on a fixed point in order to iterate through successively related units of functional information. Reorientation can occur around the function, level of granularity, or functional system. As non-limiting examples, users can receive information about function A at level X of granularity in functional system R, utilize a functional association to receive information about function B at level X of granularity in functional system R, utilize a functional association to receive information about function B at level Y of granularity in functional system R, and utilize a functional association to receive information about function B at level Y of granularity in functional system S.

In a functional information system, iteration through successive search terms is facilitated by functional relationships and functional proximity. Using a functional information system, search results incorporate a quantitative proximity metric that facilitates user discovery of results, including as non-limiting examples specific outputs being searched for and related outputs that were not initially part of the search but presented themselves as relevant through functional associations.

In some embodiments, a user's ability to reorient queries and results on fixed reference points of functional information relies on a logical data model that specifies absolute and relative positions, quantifiable relationships, and proximity metrics between data entities. In some embodiments, reorientation on functional information facilitates comparative analysis between functional entities regardless of their domain, scale, and level of complexity.

Implementation of Search System: Construction of Reference Database

A reference database will be constructed using one or more of the logical data model, stratified lexical architecture, and functional system, coordinate or graph representation methods described herein. In some embodiments, the reference database will comprise a feature set that can enhance a machine learning technique.

The database will include a set of data D extracted from one or more of text, document, video, audio, or image data. A plurality of entries in D can be associated in the database with a set of entries of functional codes, C, that can be rendered, as a non-limiting example, using the stratified lexical architecture or systems syntax described herein. In some embodiments, the codes C (will be assigned algorithmically; as non-limiting examples, the assignment can occur through an expert systems approach or a neural network model.

In some embodiments, a plurality of entries in C and D will be associated with a set of probabilities T that demarcate the likelihood that a subset of C corresponds to a subset of D; as a non-limiting example, these probabilities will be derived through a machine learning technique.

In some embodiments, the database can contain a set of functions $F=f_{1, 2 \ldots n}$, wherein a subset of F corresponds to a subset of C and D, that indicates, as non-limiting examples, common properties, attributes, values, relationships, bodies, or entities in the functional system. As non-limiting examples, the correspondence among subsets of F, C, and D) can be derived from analysis of the systems syntax and of a graph in the functional information system.

In some embodiments, the reference database can qualitatively or quantitatively order the functions in the underlying functional system based on, as non-limiting examples, the extent of the functions and relationships among elements of the functional system. As a non-limiting example, an equation from which the order is derived can be recursive, such that relationships or functions more than one degree removed from a given entity or body e can impact the order of e or f with respect to other entities, bodies, relationships, or functions in the database. A subset of the set of quantitative correlations or qualitative correspondences, O, that determine order, can be associated in the reference database with subsets of C, D, Π, and F.

Implementation of Search System: Search Processing

A search entry, which can, as non-limiting examples, include text, audio, functional coordinates, image, or video data, can be provided by a user. In some embodiments, the user, or the entities to which the user is related, can be a subset of the functional system.

In some embodiments, the engine will process the search entry to extract data d$_{in}$ related to, as non-limiting examples, functions, entities, elements, phenomena, attributes, relationships, or values in the underlying system. If the engine has information concerning the user, the engine can, in some embodiments, extract data $d_u$, concerning the user and the entities to which the user is proximate in the functional system. The engine, as non-limiting examples, can use either $d_m$ and $d_u$ or both in processing the query. The engine can compare $d_m$ and $d_u$ to the reference database.

In some embodiments, the functional information system will use a machine learning technique to probabilistically determine results given the search entry based on, as non-limiting examples, the reference database, the media item, the user, $D_u$, $D_m$, C, D, O, Π, or F, or combinations or subsets thereof. As non-limiting examples, the functional information system can probabilistically assign a set of locations comprising a set of regions or subgraphs in n-dimensional coordinate space, graph space, or both, to $d_m$, $d_u$, or combinations or subsets thereof, with the search term and the user. In some embodiments, the regions or subgraphs $r_m$ and $r_u$ corresponding to the media item and the user, respectively, will include subsets of functional space probabilistically associated with the media item or user, including connections, relationships, or areas of interest.

In some embodiments, the engine will use, as a non-limiting example, a functional proximity algorithm to return search results to the user that are proximate to $r_m$, $r_u$, or both.

In some embodiments, sets of locations $l_m$ and $l_u$ can be defined as points, nodes, or edges that are in, are functionally proximate to, or are in the functional vicinity of, $r_m$, $r_u$, or both. Sets of weights $w_m$ and $w_u$ can be derived, as a non-limiting example, from the reference database and assigned to corresponding locations $l_m$ and $l_u$. In some embodiments, non-functional data can influence the weights and locations. In some embodiments, the locations l will correspond to the codes c, $c \varepsilon C$, and the weights will be proportional to $\pi \times o$, $\pi \varepsilon \Pi$, $o \varepsilon O$.

A centroid can be defined, in some embodiments, as the central location of an entity's functional region, f, thereby defining the location of the centroid. The strength of the effects from each of the above may not be the same, and these differences can be reflected in the definition of the boundary of the user's functional region. The identification of the centroid can facilitate the analysis of large-scale functional systems by expediting the computation of functional trajectories, forces, and n-body simulations among functional entities.

In some embodiments, interactions between entities in functional space can be represented as biases which can be computed among the locations, regions, or centroids. In some embodiments, the magnitude of bias can be probabilistically inversely proportional to the distance between the locations, regions, or centroids.

In some embodiments, user clicks, connections, screen time, other related accounts, data, and responses to results will be tracked, permitting, as non-limiting examples, the user to be more accurately represented, the trajectory of entities to be more easily mapped, and the engine to provide more precise search results in the functional information system.

Search Results

Search results can be returned to the user, as non-limiting examples, as subgraphs of the graph, subregions of n-dimensional coordinate space, media items, web pages, maps, values, tags, attributes, codes, software applications, lists of entities, bodies, or functions in the functional system, augmented reality visualizations, recommendations, or potential connections, or some combination thereof, which can be ordered, as non-limiting examples, quantitatively, qualitatively, probabilistically, syntactically, spatially, aurally, temporally, graphically, or some combination thereof.

In certain embodiments, the techniques described herein can provide data to a user about related, proximate, or connected entities within the system; analytics regarding a subregion of functional space; subgraphs, subregions, or subspaces that are functionally proximate to the user and/or the search term; and recommendations regarding prospective actions within the system, as described further below.

Graphical Representations of Search Results

The methods described herein can be used to display the outputs of functional searches using a graphical user interface. In some embodiments, functional media system applications incorporate a graphical user interface allowing users and computers to interact with a centralized data store.

In some embodiments, functional information about a set of data entities can be aggregated on a separate layer in a data store, such that users can query for regions or sub-regions of the set of data entities without requiring the system to recompute the distribution of functional information from the original data entities for each query, enabling higher calculation speeds across scales of query.

In some embodiments, the graphical user interface will render query results by graphically displaying the values of the outputs and relationally ordering the values on the interface to represent functional associations and proximity relationships among individual values. In some embodiments, the display will visualize successively larger nested categories of functional tags corresponding to each value.

In some embodiments, functional feature sets augment graphical representations of search results, creating an additional layer of functional information as a result of the original search on functional information. As a non-limiting example, regions can be defined on a sub-set of the set of outputs received as the output of a search, such that the region indicates another layer of functional associations and proximity relationships resting on top of the functional associations and proximity relationships present in the original data before the search was performed.

As a non-limiting example, the coordinate representation of a set of data entities can be displayed to a user as a basemap for a representation of a graph. In some embodiments, the basemap can represent the maximal set of possible nodes and connections in a graph; in other embodiments, the basemap can be a coordinate-based orientation for a graph visualization.

The visualization of the combination of the graph and coordinate representations can enable the visualization and analysis of patterns and connectivity in large aggregate data sets associated with systems and subsystems. In other embodiments, the coordinate and graph representations can be distinct. In some embodiments, an interface will be presented to a user with a basemap in conjunction with, as non-limiting examples, geographic, temporal, mathematical, visual, functional, semantic, or syntactic representations, or some combination thereof. A user can select a region of functional, geographic, temporal, syntactic, coordinate, or mathematical space to query, visualize, sort, or analyze.

The ordered parts of a functional system can be visualized on a graphical user interface, enabling users to search and navigate functional information about the components and connections of a functional system and sub-sets of the functional system. As non-limiting examples, a user or computer can specify a set of parameters associated with the coordinate or graph representation of the functional system, which can include color, weight, size, thickness, time, location, or type of proximity metric, and receive functional information corresponding to the parameters as a result.

Functional and Syntactic Machine Learning

The methods described herein can be used, as a non-limiting example, as a means to achieve a mechanism or tool that assigns functional or syntactic locations to previously unidentified media and entities. The data systems described herein enable the synthesis of instruments that achieve the classification at scale sought by those who deal with extremely large data sets, including uses in machine learning, document identification, image processing, and natural language parsing, potentially diminishing the quantity of data required for machine learning applications.

In some embodiments, functional machine learning is an algorithmic technique, that, as non-limiting examples, can be configured to assign functional tags to words in a document or images in a picture, and then further probabilistically assign functional locations to the entities characterized within that document or picture by using the word or image-level tags.

In some embodiments, syntactic machine learning is an algorithmic technique that, as non-limiting examples, can be configured to assign syntactic tags to words in a document or images in a picture that reflect their order in an underlying functional system, and then further probabilistically assign locations in n-dimensional or graph space to the entities characterized within that document or picture by using the word or image-level syntactic tags.

In some embodiments, functional feature sets for machine learning applications can be defined as a collection of characteristics, built from the structured representation of functional information in a computing environment such as a functional information system. Given any entity in a functional system, functional feature sets can map to a collection of values which can be used in a machine learning model to predict specific outcomes or retrodict phenomena based on the entity's absolute and relative location in functional space, wherein functional space can be defined as a representation of absolute and relative locations in an underlying functional system.

In some embodiments, syntactic feature sets for machine learning applications can be defined as a collection of characteristics built from the ordered representation of information in a computing environment that reflects the order of the underlying system being modeled. Given any entity in the underlying system, syntactic feature sets can map to an ordered collection of values which can be used in a machine learning model to predict specific outcomes or retrodict phenomena based on the entity's absolute and relative location in an n-dimensional or graph space representation in the underlying system.

Functional and syntactic feature sets can be relational insofar as they specify interrelationships or common properties between elements, and all elements represented by functional or syntactic information can be expressed as a feature in a functional or syntactic feature set. By referencing elements and interrelationships of an underlying system, functional and syntactic feature sets can improve, as non-limiting examples, the speed, accuracy, and precision of machine learning predictions.

A set of outputs of a functional proximity algorithm can, in certain embodiments, comprise a training set for a machine learning technique. As a non-limiting example, the outputs can enable the more rapid or precise prediction of a functional location in n-dimensional space associated with a data entity in a test set. In other embodiments, the outputs can enable the prediction of outcomes in the functional system more precisely, as determined by a test of statistical significance.

Notions of functional and syntactic proximity enable a machine learning system to have a more robust system for error correction. As a non-limiting example, a machine learning algorithm would take a set of natural language or image media describing a particular entity and assign a set of functional tags to each one. If entities described in these documents were previously classified accurately from another set of documents, one could compare results between the two sets of classifications. Because there is a notion of proximity within functional space, the predicted values can be systematically compared with one another to assess similarity. Instead of a binary indication of the correctness of classification, the level of incongruence can be quantified and measured by assessing the functional proximity among the predictions. The resulting information can be fed back into the machine learning algorithm, allowing for a more robust testing and classification procedure, as discussed below.

The application of functional or syntactic machine learning thus allows for a predictive proximity layer to be applied to the machine learning process. If the algorithm makes predictions that are functionally or syntactically proximate, each individual prediction and classification can have a higher degree of confidence associated with it. Conversely, if predictions are functionally or syntactically distant, each individual prediction and classification can have a lower degree of confidence associated with it.

In some embodiments, an application of functional or syntactic machine learning can allow other previously more rigid applications of machine classifications to be updated to include a functional attribute and a functional or syntactic proximity dimension. If a machine learning application's required end classification groups can be differentiated functionally or syntactically, then an updated machine learning application would require a set of functional coordinates to be associated to the previously classified groups in order to increase the updated application's confidence about its predictions.

In some embodiments, functional and syntactic machine learning techniques allow for the ranking of search results based on features to assess how appropriate a member is within a group. As a non-limiting example, ranking search results based on appropriateness can entail first selecting a set of documents and asking the question, "which of these entities is most likely an orthopedic implant?" and then narrowing a set of reports, websites, or filings from thousands to dozens or a handful; this technique can also entail the ability to ask what entity of a set of data entities is the most "orthopedic implant"-like. Ranking is a machine learning output technique where the machine learning algorithm sorts the inputted information according to which entities match a criterion the best. Therefore, the ability to grant rank or have classes of ranked entities becomes a feature usable to enhance search results for functionally or syntactically proximate entities, as the highest-ranked classes probabilistically will be better classification categories and higher scoring as a result.

In some embodiments, functional and syntactic machine learning techniques also enhance how functionalities such as autocomplete are employed. Traditional, non-machine learning methods for autocompleting search queries involves gathering previously provided information, such as past searches or indexed keywords and headers. The introduction of functional or syntactic machine learning techniques can, in certain embodiments, add accuracy or a new dimensionality to autocompletion of search results by suggesting functionally or syntactically proximate terms or results or natural language alternative words that are marked with proximate functional or syntactic tags.

Further, different machine learning techniques can be applied to functional and syntactic sets of entities that were previously not possible. As a non-limiting example, methods like k-nearest neighbors, clustering, or support vector machine can use a type of functional or syntactic proximity to define distance in a representative space. In some embodiments, the system can be implemented such that graphing a set of data entities enables representation of the probability.

In some embodiments, given past data and past classifications regarding a set of entities, a prediction of future functional coordinates can be made on a given entity given similar past data. If an entity with a functionally proximate associated past coordinate has a more recently updated coordinate, then a prediction or functional projection can be made on the original entity's coordinate. Non-functional data can also be incorporated into the prediction process, from common features and differences in past global events, geographic location, or other shared attributes.

In some embodiments, a custom feature set can be constructed, which can comprise, as non-limiting examples, a plurality of tags, metatags, strings, code sequences, nodes, edges, or outputs of functional or syntactic proximity algorithms, which can be denoted, as non-limiting examples, as vectors, tensors, matrices, or arrays.

In some embodiments, given some functional or non-functional data about a particular entity, functional or syntactic machine learning techniques can be applied to infer additional functional and syntactic information about the entity. As a non-limiting example, a machine learning system can use certain data to predict a location or area for the entity within functional or syntactic space; the machine learning system can then predict particular information about the entity using the input information in conjunction with information regarding other entities which occupy a similar functional or syntactic space.

Learned correspondence among entities with similar functional, syntactic and non-functional data can be applied to predict the functional locations and classification codes of additional entities in the system.

In some embodiments, feature sets for functional or syntactic machine learning techniques are selected from among legacy codes, natural language terms, documents, images, videos, metatags, syntactic tags, functional code sequences, functional locations, functional regions, and probabilistic associations among combinations of the foregoing. A legacy code can be defined as non-functional, non-syntactic prior art data. The functional or syntactic machine learning technique can select from among legacy codes, natural language terms, documents, images, videos, syntactic tags, functional locations, functional regions, and functional sequences as outputs. As a non-limiting example, a functional or syntactic machine learning technique will use inputs comprising legacy codes, associated natural language terms, and syntactic tags to probabilistically predict a legacy code for an element of an underlying functional system identified in a document in a test set.

In some embodiments, functional or syntactic machine learning can be applied to topic modeling and document summarization. By applying functional tags at the word level, the system is able to abstractly represent tangible concepts in generalized, interoperable, manipulable, and information-dense terms.

Functional and Syntactic Recommendation Engine

The methods described herein can be used to make recommendations to users of a functional information system. As non-limiting examples, these recommendations can be derived from the entities and their syntactic and empirical relationships; the functional, syntactic, temporal, or geographic tags, attributes, values, or metrics assigned to the entities; the relationships or connections among the data entities in the syntax, graph, or database; the express and revealed preferences of the users of the database or software; or the relationships of the users in a network structured based on the techniques described herein.

In some embodiments, the functional algorithms described herein that are used for functional search can, as a non-limiting example, determine, correspond to, or influence the recommendations offered to users.

In some embodiments, entities sharing numerous recent or heavily weighted relationships with one another, or with a common third party, will be proximate within one or more databases used to provide recommendations, while entities without common or current relationships can be distant within those databases.

User preferences, current user state, user data including historical and current actions, and network positions, as described further below, can facilitate the customization of recommendations based on functional or syntactic proximity calculations. In some embodiments, users can input their express preferences, whether syntactic, functional, non-syntactic, non-functional, or some combination thereof, and associated values into the system upon registering to gain access to the database. In other embodiments, these preferences or filters can be modified at any time, either through a separate module or by indicating a preference regarding a set of entities.

As non-limiting examples, one or more filters can be absolute, in that they permit the user to exclude or include certain relationships, attributes, tags, values, metatags, strings, or entities; one or more filters can be relative, in that they enable the user to indicate the extent of a preference regarding certain relationships, tags, metatags, attributes, strings, values, or entities, where the system can also suggest non-requested results that are functionally or syntactically proximate to explicit search.

Users can also reveal their preferences through interactions with data entities, or other users, associated with the system. In some embodiments, preferences will be revealed by tracking user accounts, monitoring screen time, clicks, and other actions performed on the system, and using machine learning approaches to improve dynamically the customized recommendations to a user based on preferences. In some embodiments, users can upload a set of entities, relationships, attributes, values, or preferences to the system, which can be used to guide customized recommendations.

Network position can facilitate proximity calculations and dynamic, customized recommendations. The computer system can track connections among users and the extent of their interactions. In some embodiments, strong connections among users on the system will lead their recommendations to converge significantly, weak connections will lead the recommendations to converge slightly, and numerous degrees of separation will lead the recommendations to diverge.

In some embodiments, similarities among users in the system can lead the recommendations provided to them to converge, while differences among the users can lead the recommendations to diverge. As a non-limiting example, the system can refine customized recommendations at varying levels of specificity based on changes in the network of users, their preferences, or the tags, attributes, values, relationships, metatags, strings, or lexical units assigned to the entities.

The results of functional or syntactic proximity algorithms can, in some embodiments, be used as inputs to recommendations. As a non-limiting example, a user can seek a recommendation regarding an entity at a certain degree of removal within the functional system. A functional or syntactic proximity algorithm can be selected which accounts for degrees of removal through alignment-based modifications.

In certain embodiments, non-functional data can be used, in certain embodiments, as an input to the recommendation engine described herein. As a non-limiting example, functional and geographic data can be combined; a recommendation algorithm can compare the extent of similarity of a plurality of sequences, tags, or metatags in a given geographic region, and derive comparative functional or syntactic proximity results among the plurality of sequences, tags, or metatags. A composite functional or syntactic proximity result can be derived, as a non-limiting example, through matrix multiplication. In certain embodiments, the comparative functional or syntactic proximity results can be reweighted by a set of metrics associated with the functional system, the functional information system, the geographic region, or a combination thereof. In certain embodiments, the metric will be selected from among the proximity result itself and a location-quotient based metric.

The recommendation engine can, in certain embodiments, use the proximity algorithm derived from the combination of functional and geographic data to determine proximate geographic regions to a reference region. As a non-limiting example, the recommendation engine can then use another functional proximity algorithm to query for, as non-limiting examples, code sequences, paths, pathways, tags, or metatags that can modify outcomes in the functional system in the reference region. In some embodiments, the extent of modification can be compared with empirical data and verified through a test of statistical significance.

The prospective recommendations, in certain embodiments, can be adjusted through the use of a set of metrics which incorporate the prevalence or effect of sequences, tags, codes, metatags, paths, or pathways by region: as a non-limiting example, the metric chosen can be a location quotient. In certain embodiments, the metrics chosen from a location quotient, a simulated outcome in the functional system, and empirical outcome in the functional system.

Functional Media Systems (FMS)

Functional media systems optimize search and navigation of functional information by streamlining operations by which an arbitrary number of users using an arbitrary number of applications can receive, send, create, and update functional information using a centralized data store that manages linkages across applications and allocates information to users based on their functional identity, the summation of functional and non-functional attributes corresponding to a data entity or user of a functional information system.

Constructing a Functional Media System

In some embodiments, a functional media system has an applications layer, including, as non-limiting examples, programs that allow users to interact with functional information by reading, writing, updating, and tagging functional and non-functional data entities with, as non-limiting examples, the metatags, code sequences, and stratified and segmented lexical architectures described herein. A functional media system can contain at least one user-facing application.

In some embodiments, applications in a functional media system are built on top of a data store that takes in information and indexes it for use by applications. The functional information system can have a services layer. One or more roles of these services can be to electronically apply at least one functional tag to incoming data using computer-assisted classification algorithms, or the data can already have at least one functional tag assigned to it upon inclusion in the system. The services layer then can categorize data and send it to a storage layer based on the type of data being manipulated, including as non-limiting examples coordinate-based data, identifying entity data, and data related to performance within the underlying system or the functional information system.

In some embodiments, services or applications can draw on and contribute to the centralized data store when specific functional and non-functional information is needed or created by an application. Other applications can register to access the data store, which can enable the applications to automatically receive the propagation that a data entity has changed upstream and immediately begin transmitting the updated data entity for use.

Because the data store standardizes the capture, organization, and transmission of information according to function, in certain embodiments, the applications drawing on the data store can communicate in a common standardized language to describe the data, which can include the stratified lexical architecture and syntactic tagging techniques described herein, enabling streamlined system wide communication of new additions or updates to the data store.

In some embodiments, specific applications can require one or more specific layer abstractions that modify data received from or sent to the centralized data store and convert it into a form that is optimized for that specific application and its users.

In some embodiments, the centralized data store of a functional media system will communicate with applications layer in a variety of ways, including as non-limiting examples push notifications and point-to-pull notifications, that manage linkages and facilitate messaging across applications. These communications can be automated based on the functional identity of the user, recipient, or sender of information, as well as the underlying data being transmitted, or can be requested manually.

Functional Media System: Applications

The methods described herein can be used in connection with a functional media system that operates as a layer of operations that executes on top of a layer of functional information system operations for the purpose of creating and distributing functionally tagged information, such as media items, between users in a network.

In some embodiments, the applications layer of a functional media system can enable a distributed communications system that transmits information and filters messages among users of a set of applications, according to the functional identity of the users, their current state of registration and authentication, and the information being transmitted. Functional identity refers to the collection of values, attributes, and tags associated with a data entity in a functional information system according to the absolute or relative position of its corresponding referent element in the underlying functional system.

Each user of a functional media system and media item transmitted through the system can occupy one or more functional identities based on the set of functional tags assigned to them representing their specific role in the underlying functional system. Machine learning approaches can be utilized to assign functional tags and identities to users of a functional media system and elements of a functional system.

In some embodiments, users of a functional media system share and receive data feeds associated with the functional identity of the user and of the information itself. As non-limiting examples, users can receive and access alerts or notifications from feeds of functionally tagged information, static as well as regularly updating databases of functionally tagged information, and visualizations and analytics that represent, summarize, and identify patterns associated with functional information. Functional proximity algorithms and functional recommendation engine technology can be used to calculate the relevancy of a particular media item to a user of a functional media system, based on a set of inputs including as non-limiting examples the functional identity of the user, and the browsing and transactions history and preferences of the user as well as other users with a similar or different functional identity. Functional identity can increase the dimensionality of search space by adding user-specific and function-specific dimensions.

In some embodiments, users of a functional media system share user-generated information with other users based on existing functional relationships, including as non-limiting examples, a functional relationship between the two users, between the two users and other users, between the users and other elements of the functional system; the functional relationship can include interest in a connection as well as a pre-existing connection between two users of a functional media system or elements of a functional system.

In some embodiments, users of a functional media system share user-generated information based on an interest in a functional relationship or element of a functional system, the interest being indicated through a user request or other interaction facilitated by the functional media system. Users can browse or contact existing connections as well as posited connections based on functional relationships, as non-limiting examples belonging to the same functional system, having a shared need for a specific input, output, or process, and fulfilling a similar function in different or related systems.

Functional information systems enable search and navigation capabilities in functional media systems by filtering out irrelevant information and facilitating identification of interesting and sought after information. In a functional media system, the types of data that are sent to users or that users seek out is scoped by the functional identity of the user as well as the media being transmitted.

Functional Media System: Functional Media Markers

In some embodiments, machine learning approaches can be used to populate and structure functional media systems by assigning functional or syntactic tags to all or part of large data sets associated with underlying systems. The assignment of media markers can incorporate the use of the logical data model, syntactic tagging, stratified lexical architecture, graph, and coordinate representation techniques described herein in a functional media systems context.

As non-limiting examples, a feature, attribute, or function, or combination thereof, can be identified from a directory or library and tagged as an element of a media item. As non-limiting examples, media items can be in text, audio, video, code, digital, any other type of media that can be converted into a digital format, or some combination thereof. A directory or library of media markers can be stored which indicates the prevalence or location of a set of feature, attribute, or functional tags, or relationships among them.

In some embodiments, associations can be defined between sets of features, attributes, functions, tags, and media markers based on linguistic, syntactic, semantic, graphical, auditory, visual, textual, or functional elements in a media item. A tag can be assigned to the media item based on the prevalence or location of a linguistic, syntactic, semantic, graphical, auditory, textual, visual, or functional element, or the relationship among a set of elements. In some embodiments, the media item can be processed to relate it to other elements in the database. As a non-limiting example, one or more databases can be configured based on an automated training process. As non-limiting examples, the machine learning process can be supervised, semi-supervised, or unsupervised.

In some embodiments, a confidence score can be associated between a feature, attribute, or functional tag and an element. The confidence score demarcates the probability of association among the feature, attribute, functional tag, or element within a test set based on data from a training set.

The media item can be processed to extract additional functional tags to hypothesize a sub-library based on the markers, enabling the determination of a confidence level for the contextual library selection.

In some embodiments, a computer-assisted classifier can provide a score based on a plurality of features, tags, attributes, or functions.

In some embodiments, an element can be compared to a media marker from the library or directory and associated if there is a match above a certain threshold. A computer-assisted classifier can enable the assignment of the media marker to the element. As a non-limiting example, a processor can extract relevant terms from the media or library in the directory. The classifier can be configured with markers extracted from the media and their functions, tags, codes, attributes, features, or some combination thereof.

As a non-limiting example, this methodology can be used to recharacterize or change prior codes. A score can be assigned based on a set of parameters and algorithms to determine whether the recharacterized codes account for a set of phenomena in the system more effectively than previous codes.

In some embodiments, a functional application database can be stored, including, as non-limiting examples, information regarding functions, tags, attributes, or features. The processor can associate a classifier to an extracted element to classify it to a plurality of attributes, tags, functions, or features associated with a functional application.

In some embodiments, a user can be presented with an unstructured media item and a set of scores, and a set of actions to be performed using an extracted parameter. As a non-limiting example, a user can have the option to modify an intended action. The action can enable the user to view the media item, the received information, and the score of each action to assist the user to decide whether to modify and affect performance of an intended action.

Application: Matching Multidimensional Projections of Functional Space

Some embodiments can include a method for algorithmically using an n-dimensional representation derived from a systems syntax for projecting location or relationships associated with data entities in n+k-dimensional space, the method comprising: electronically representing a systems syntax, wherein the systems syntax comprises a logical data model that can be applied by a computer processor to evaluate or generate expressions of elements, wherein the elements represent parts, processes, and interactions of an underlying system; electronically receiving an input from a computing device, wherein the input is capable of being represented as a functional location in n-dimensional space, and wherein the data entities at a functional location characterize one or more of the elements, and storing the input as a data entity; wherein at least one of the dimensions in the n-dimensional space represents a functional domain, the functional domain comprising attributes of roles, order, or relationships among the elements; electronically assigning a set of functional locations in the n-dimensional space to the data entity, the locations based on attributes of the data entity; algorithmically computing a syntactic proximity among a set of functional locations by executing an algorithm based on the systems syntax on a set of the locations in n-dimensional space, wherein the syntactic proximity characterizes a quantitative or qualitative measure of similarity amongst attributes of the elements of the underlying system with respect to a projection of the functional location; algorithmically computing a projection of location or relationships associated with one or more of the elements in the underlying system as represented by the data entity in the n-dimensional space, based on the computed syntactic proximity.

In some further embodiments, the methods can include algorithmically computing a functional trajectory of the data entity based on a relationship of the data entity to reference points in the n-dimensional space or movement of the data entity with respect to the reference points, the trajectory representing a direction associated with a set of paths through functional locations in the n-dimensional space; algorithmically computing a functional velocity of the data entity based on a measurement of a change of the location or relationships relative to positions or the reference points at two or more points in time; using the functional trajectory and functional velocity as an algorithmic input to improve projective precision or accuracy.

In some further embodiments, the methods can include electronically constructing a graph representation of a set of the locations in n-dimensional space by assigning nodes to a set of the parts and processes and edges to a set of the interactions or relationships amongst the parts and processes; algorithmically computing a graph proximity by executing an algorithm that computes similarity amongst the elements based on strength, quantity, or degree of connection amongst the nodes and the attributes of the nodes in the graph representation; and algorithmically computing a composite proximity by executing an algorithm that integrates the computed syntactic proximity and output of the graph proximity algorithm; using the composite proximity to increase the precision or accuracy of the projected location or relationships.

In some further embodiments, the methods can include associating one or more elements and a functional location with a set of users; algorithmically computing the syntactic proximity amongst a plurality of users or elements; applying a syntactic vicinity algorithm to define a group of users and elements based on the computed syntactic proximity; predicting a quantitative or qualitative outcome for the group; wherein the group exhibits a higher correlation to the predicted outcome than the elements that are not in the group, as determined by a test of statistical significance.

In some further embodiments, the methods can include wherein the group comprises a statistical control group, and wherein the syntactic vicinity algorithm executes steps for identifying a subset of the data entities including the selected data entity in n-dimensional space which are located within a threshold syntactic proximity of one or more elements represented by data entities, further comprising: applying the syntactic vicinity algorithm to a second group of users and elements; computing the syntactic proximity between the statistical control group and the second group; using the syntactic proximity and the predictive quantitative or qualitative outcome or an empirical outcome from the statistical control group to project an outcome for the second group.

In some further embodiments, the methods can include, wherein the functional domain is biological, and a plurality of elements are selected from among genes, nucleotides, proteins, molecules, organelles, organs, organ systems, organisms, species, populations, and ecosystems, further comprising using the syntactic proximity as a basis for predicting, recommending, or engineering biological composition, structure, location, relationships, or outcome.

In some further embodiments, the methods can include wherein the functional domain is economic, and a plurality of the elements are selected from among individuals, jobs, skills, products, companies, resources, and activities; further comprising using the syntactic proximity as a basis for predicting, recommending, or engineering economic composition, structure, location, relationships, or outcome.

In some further embodiments, the methods can further comprise: integrating the graph representation with a second graph representation such that the first graph representation comprises a subgraph; associating one or more elements with a user;

associating a set of metrics related to syntactic proximity to route the user to alternate paths; and relating the set of metrics to predicted outcomes in the underlying system.

In some further embodiments, the methods can include wherein the group represents a geographic region, biological system, or grouping of functional assignments, wherein the functional trajectory represents a developmental path for the geographic region, biological system, or grouping of functional assignments, and wherein the functional velocity correlates to a growth rate, further comprising computing the predictive functional location as an input to a recommendation engine.

In some further embodiments, the methods can include wherein the functional domain is economic and the syntactic proximity defines a functional distance comprising a mapping from at least two points in at least one dimension in the n-dimensional space to a real number, further comprising: algorithmically comparing the functional trajectory of a plurality of economic elements based on a set of qualitative, quantitative, geographic, or temporal attributes of the economic elements; using the functional trajectory as an input to a search, recommendation, matching, or analytical result provided to a user.

In some further embodiments, the methods can include identifying a functional region proximate to the data entity in n+k-dimensional space; modifying the functional region based on a preference, or from interactions between the data entity and other elements of the functional system; wherein the functional trajectory or functional velocity of the data entity corresponds to a path in the underlying system or in a digital representation of the underlying system; and providing a set of projections of code sequences, paths, pathways, tags, or metatags for modifying outcomes in the functional system.

In some further embodiments, the methods can include wherein the search or recommendation result relates to economic, financial, or policy objectives, further comprising providing a set of potential or actual economic incentives, tax policies, labor policies, workforce policies, industrial policies, monetary policies, fiscal policies, acquisitions, mergers, divestitures, or investments to a user.

In some further embodiments, the methods can include wherein the search or recommendation result relates to workforce development or labor, further comprising providing a set of career paths, job opportunities, labor distributions, educational distributions, recruitment pools, skill levels, job responsibilities, economic metrics, staffing recommendations, or advertisements to a user.

In some further embodiments, the methods can further comprise assigning k-dimensions in the n+k-dimensional space to temporal, geographic, demographic, biological, genetic, financial, policy or economic data; wherein the data comprises quantitative, qualitative, textual, visual, aural, audiovisual, tactile information; computing a predictive functional location in the n-dimensional space based on a set of the k-dimensions.

In some further embodiments, the methods can include using a word embedding algorithm that renders textual data based on semantic proximity to construct a subset of the n+k dimensional space based on a corpus; and integrating the semantic proximity and the syntactic proximity to enhance the computation of predictive functional location.

In some further embodiments, the methods can include constructing or augmenting a corpus based on syntactic proximity in n+k dimensional space; using the corpus to provide or augment the predictive functional location or a search or recommendation result.

In some further embodiments, the methods can include wherein the statistical control group comprises a work or labor force distribution of a region, company, sector, or industry, further comprising: associating a set of metrics or outcomes with the statistical control group; computing predictions of a set of paths or locations in the underlying system related to the work or labor force distribution of a second region, company, sector, or industry; wherein a user is associated with the second region, company, sector, or industry; providing recommendations to the user regarding paths or locations.

In some further embodiments, the methods can include executing a fuzzy query where elements can be identified or matched based on the intersection of two or more functional areas defined by the syntactic proximity of their functional location.

Some embodiments can include a functional connectivity system comprising a computing environment configured to perform a database operation utilizing a computerized representation of a functional system, the system comprising: an electronic data store comprising a set of data entities in a database system, the data entities representing elements of the functional system, wherein the functional system comprises a group of related elements ordered by their functional roles in converting inputs to outputs, or as the inputs, or as the outputs; an electronic representation of a systems syntax, wherein the systems syntax comprises a logical data model that can be applied by a computer processor to evaluate or generate expressions of elements, wherein the elements represent parts, processes, and interactions of an underlying system; receiving a set of functional locations from a database, wherein a function represents a conversion from inputs to outputs or a role or property in the conversion from inputs to outputs in the underlying system and a functional location comprises a position of an entity as an input, output, intermediate, relationship, or process associated with inputs, intermediates or outputs; algorithmically computing the proximity among a plurality of the entities or attributes representing the entities based on their functional locations; and identifying or matching the entities or the attributes representing the entities based on the proximity of their functional locations.

In some further embodiments, the system can include wherein non-functional attributes can be used as an input in the process of identifying or matching of entities, and wherein the functional locations can be identified semantically, syntactically, graphically, symbolically, visually, or aurally; and wherein non-functional attributes comprise an economic metric, a financial metric, demographic data, geographic data, temporal data, or experiential data.

In some further embodiments, the system can include wherein the functional system is an economic system, and wherein the data entities comprise enterprises, individuals, products, franchises, facilities, resources, government entities, industries, sectors, independent contractors, or nonprofits, further comprising identifying or matching entities for communication, transaction, advertising, investment, taxation, incentive programs, policy measures, or donation.

In some further embodiments, the system can include wherein the functional system is an economic system, and wherein the data entities comprise jobs, skills, tasks, workers, workforces, employers, educational institutions, training institutions, and research institutes, further comprising identifying or matching entities for recruiting, job search, hiring, labor policy, workforce development, skill development, training, apprenticeship, coaching, mentorship, management, leadership development, entrepreneurship, incubation, or acceleration.

In some further embodiments, the system can include wherein the functional system is a biological system, and wherein the data entities comprise genes, nucleotides, genetic sequences, molecules, expressed proteins, biological organisms, organelles, organs, organ systems, species, or populations, further comprising identifying or matching entities for bioinformatic analysis, synthetic genomics, gene editing, or drug discovery.

Application: Data Filtering

The methods described herein can be used, in certain embodiments, to filter data or information related to, as non-limiting examples, functional, geographic, temporal, physical, chemical, biological, visual, or aural systems, or representations thereof. As non-limiting examples, the filtering can be lossless or lossy. In some embodiments, as non-limiting examples, the data filtering can be grammar-based, graph-based, semantic, syntactic, image-based, matrix-based, or some combination thereof.

Application: Process Improvement

The models described herein can be used, as a non-limiting example, to improve the allocation or flow of resources throughout an underlying functional system, which can comprise at least one network, sub-network, or sub-system. The associated algorithm can be a response to a search request from a user; in some embodiments, the capacity to demarcate functional attributes of the user and location of the user in the functional system will enhance the optimization process.

In some embodiments, properties related to the functional system, which, as non-limiting examples, can be temporal or operational, will be used as inputs to an improvement process, in which different functional components will be reengineered or redesigned based on the preceding analytical process.

In some embodiments, the capacity of the logical data model, syntactic tags, and representations in functional n-dimensional and graph space to map underlying functional systems and their interrelationships facilitates targeting improved outcomes for sub-systems and processes in the underlying functional system, while accounting for effects on related sub-systems and processes. Targeting improved outcomes can include improved outcomes for the underlying system as a whole as well as for specific sub-systems and processes.

The model can be applied, in certain embodiments, to analyze functional systems to understand scenarios and decision processes and can use, as non-limiting examples, functional and syntactic proximity, ranking, and scoring systems to evaluate outcomes. In some embodiments, a machine learning process can be designed which takes as inputs large datasets associated with the correspondence among outcomes in the functional system and locations in functional space; develops a probability space based on that correspondence; uses a feature set comprising the correspondence, the probability space, and the input data; chooses a plurality of variables to optimize; and assesses the probability of optimal outcomes for a test set.

Application: Organizing Links Among Platforms

The techniques described herein can be used, in certain embodiments, to develop an underlying ontology or systems syntax among, as non-limiting examples, databases, applications, software tools, and platforms characterizing or modeling, as non-limiting examples, a complex system or functional system. The linkages reflected through the ontology or systems syntax can facilitate the interoperability of the databases, applications, software tools, platforms, or some combination thereof.

In certain embodiments, the techniques described herein can provide a unifying mechanism to regulate and manage functional systems, which can be facilitated through the development of a visualization tool that relates, as non-limiting examples, the tools and platforms characterizing the underlying systems.

Application: Systems Analysis

The methods described herein can permit the computation of expression levels of populations in complex or functional systems across, as non-limiting examples, scale, time, geography, and domain to enhance analytics and queries within the functional information system as well as to improve intervention within the complex or functional system. The techniques described herein related to descriptive analytics can improve the capacity to understand the composition or properties of a plurality of subsets of a functional system; in some embodiments, the techniques described herein may be applied to improve the messaging and connections within a functional media system.

The capacity to map the trajectory of elements, as non-limiting examples, can facilitate improved forecasting regarding the future properties, attributes, or locations within the functional system or representations thereof. In some embodiments, the predictive analytics described herein can, within a functional media system, influence actions taken by a plurality of users.

The capacity to tag large population sets can facilitate, as non-limiting examples, reorganization, stratification, and diversification according to functional or syntactic characteristics in conjunction with normative models. The use of normative analytics can enable more consistent achievement of statistical outcomes within the functional system or representations thereof, as determined by a test of statistical significance.

In some embodiments, a sub-element of an underlying functional system can be dependent on other elements of a functional system. In some embodiments, a super-element of an underlying functional system can be dependent on other elements of a functional system. As non-limiting examples, the first sub-element or super-element can provide information or energy to another element or to the larger functional system.

In some embodiments, syntactic and graph modeling techniques can enable users to query, visualize, and analyze results relating to the functional system including as non-limiting examples for diagnostic purposes and for predicting outcomes in functional systems.

Application: Systems Simulation

The methods of characterizing complex systems described herein can be used, as non-limiting examples, to simulate the performance or behavior of a complex system under a set of parameters. In some embodiments, nodes can be assigned to connected computing devices, enabling massively parallel simulation of distributed, complex, or functional systems, or a combination thereof.

As a non-limiting example, the properties of entities based on their functional location or attributes can be used to define their behavior as autonomous actors within an agent-based modeling system.

Application: Functional Genomics

In some embodiments, the methods described herein can be applied, as non-limiting examples, to biological, genomic, proteomic, genetic, or neural systems or databases. A systems syntax can be developed and applied to functions, attributes, tags, metatags, features, values, or attributes associated with data related to a biological, genetic, genomic, or neural system. As non-limiting examples, a set of genes, chromosomes, neurons, cells, tissues, organs, organ systems, organisms, populations, or ecosystems can be modeled according to the systems syntax using graphs, networks, coordinates based on the functional relationships described herein.

In some embodiments, using the techniques described herein, the capacity to functionally map genomic systems in a way that relates them to biological systems at higher levels of complexity may enable applications in gene editing, diagnostics, and predictive analytics.

Application: Functional Relationship Networks

An upper level domain can be based on applications of the functional information system. The upper level domain locus can be used herein as an example, although any arbitrary combination of allowable characters could be used as the domain name. The .locus upper-level domain and each lower-level domain provide user access to a global functional map of data entities organized according to the functional locations and functional language of a functional information system. Lower-level domains can be scoped according to functional identity and can provide context-based views into the global functional map.

In some embodiments, the .locus upper level domain and each lower level domain interfaces with and accesses a syntactic functional database where data entities are tagged, as non-limiting examples, with coordinates from interrelated and integrated standardized coordinated-based tagging systems, including, as non-limiting examples, geographic coordinates and temporal coordinate systems.

The functional relationship network can rely on the identification of a common anatomy and physiology demarcated through structuring functional terms based on the techniques described herein rather than an ad hoc collection of natural language terms. The identification of a set of natural sequences to the underlying system and the syntactic codification of common functional roles permits new notions of connectivity in the network. In the inventive logical data model, the underlying set of functions and relationships are common to a plurality of functional systems regardless of the underlying role of any specific system or sub-system thereof.

In some embodiments, a systems syntax for functional information can be applied to define the web architecture for lower-level domains as they are instantiated through user accounts and profiles for functional systems at various scales. The systems syntax can identify the functional identity of a user who creates an account and a profile, such that every page in the network will have a functional identity with a common set of functional relationships to other pages in the system. As a non-limiting example, the specific function of the user can comprise part of the domain name for their specific page; in other examples, the function and accompanying functional associations are specified on the back-end.

As a non-limiting example, in some embodiments, the platform comprises a communication system in which a set of functionally identified users form a network. Within the platform, users can search and navigate through the user base to locate other users of interest based on functional identity. The platform provides users with tools to facilitate interaction, including as non-limiting examples, secure messaging, targeted communication, secure financial transaction, and identity verification. The platform can curate information for users based upon functional identity, including data, products, and other entities of interest to the user.

Users of the platform can self-update identity, which comprises functional and non-functional information, to improve search, navigation, communication, and curated results. The platform can dynamically update the users' functional identities based upon user behavior, including as non-limiting examples communication with other users or frequent queries. In some embodiments, an autovicinity algorithm may use the techniques described herein to define a set of vicinities of interest for the users based on the outputs of a selected functional proximity algorithm, which can enable the semi-automated formation of organic communities among users.

Application: Retrodictive and Predictive Analytics in Systems Development

In some embodiments, the methods described herein may be applied as an algorithmic method for dynamically making predictions for a large dataset representing an underlying functional system, such as: dynamically predicting relationships among elements of an underlying functional system; dynamically predicting outcomes of parts or wholes of an underlying functional system from the relationships among elements of an underlying functional system; and dynamically predicting relationships among elements of an underlying functional system from the outcomes of parts or wholes of an underlying functional system. The representations can be derived from coordinate or network unification of linguistic, visual, mathematical, or symbolic representations of the system.

The methods described herein can be used to enhance the retrodictive and predictive capacity of information systems, enabling them to take as an input a relationship, outcome, or qualitative variable associated with an underlying system and use one or more of the stratified lexical architecture, systems syntax, logical data model, coordinate representation, and graph representation to predict or retrodict another relationship, outcome, or qualitative variable. For example, using granular geographic coordinates to study traffic behavior on a specific corner or intersection in a city, a computer system can predict the traffic patterns of an entire city transportation system. Conversely, studying a whole city's transportation plan, the system can predict traffic patterns at a more granular level such as a street corner. In both cases, the computer system associates traffic data with fixed geographic coordinates in order to organize information about activity taking place at nested levels within the same coordinate system. Mapping geographic coordinate-based tags to traffic data enables the identification of specific linkages at specific levels in the system and across different levels in the complex transportation system.

The same process, linkages, and interrelationships exist in coordinate-based functional systems. If one replaces the transportation system described above with a functional system, such as a biological cell or an airplane engine, then similar inferences about interrelationships, as well as retrodictions and predictions about the composition and outcomes of the functional system at multiple levels of the system, can be made. The natural language terms associated with the internal elements of the functional system can be converted into a set of functional coordinates consisting of one or more interrelated levels of representation.

Using coordinate-based representations of functional systems, information about functional activity in one part of the system may be used to inform predictions of activity in other parts on the same level or different levels in the functional system, similar to predictions or retrodictions of activity at one level based on an activity in a different part of the same level or different levels of a transportation system using geographic coordinate-based representations of the system. In the above example, any type of single or multi-level functional system such as biologic, genomic, genetic, mechanical, structural, fluid or information system can be inserted for the example above that uses a functional economic system. The capacity to map a system using coordinates facilitates prediction and retrodiction across relationships, levels, qualitative variables, and outcomes.

System Architectures

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An example computerized system for implementing the invention is illustrated in the figures. A processor or computer system can be configured to particularly perform some or all of the method described herein. In some embodiments, the method can be partially or fully automated by one or more computers or processors.

The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™ Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A computer-implemented method executing on a processor coupled to a memory for algorithmically using an n-dimensional representation derived from a systems syntax for projecting location or relationships associated with data entities in n+k-dimensional space, the method comprising:
  electronically representing a systems syntax, wherein the systems syntax comprises a logical data model that can be applied by a computer processor to evaluate or generate expressions of elements, wherein the elements represent parts, processes, and interactions of an underlying system;

electronically receiving an input from a computing device, wherein the input is capable of being represented as a functional location in n-dimensional space, and wherein the data entities at a functional location characterize one or more of the elements, and storing the input as a data entity;

wherein at least one of the dimensions in the n-dimensional space represents a functional domain, the functional domain comprising attributes of roles, order, or relationships among the elements;

electronically assigning a set of functional locations in the n-dimensional space to the data entity, the locations based on attributes of the data entity;

algorithmically computing a syntactic proximity among a set of functional locations by executing an algorithm based on the systems syntax on a set of the locations in n-dimensional space, wherein the syntactic proximity characterizes a quantitative or qualitative measure of similarity amongst attributes of the elements of the underlying system with respect to a projection of the functional location;

algorithmically computing a projection at a point in time of location or relationships associated with one or more of the elements in the underlying system as represented by the data entities in the n-dimensional space, based on the computed syntactic proximity.

2. The method of claim 1, further comprising:
algorithmically computing a functional trajectory of the data entity based on a relationship of the data entity to reference points in the n-dimensional space or movement of the data entity with respect to the reference points, the trajectory representing a direction associated with a set of paths through functional locations in the n-dimensional space;

algorithmically computing a functional velocity of the data entity based on a measurement of a change of the location or relationships relative to positions or the reference points at two or more points in time;

using the functional trajectory and functional velocity as an algorithmic input to improve projective precision or accuracy.

3. The method of claim 2, further comprising:
associating one or more elements and a functional location with a set of users;
algorithmically computing the syntactic proximity amongst a plurality of users or elements;
applying a syntactic vicinity algorithm to define a group of users and elements based on the computed syntactic proximity;
predicting a quantitative or qualitative outcome for the group;
wherein the group exhibits a higher correlation to the predicted outcome than the elements that are not in the group, as determined by a test of statistical significance.

4. The method of claim 3, wherein the group comprises a statistical control group, and wherein the syntactic vicinity algorithm executes steps for identifying a subset of the data entities including the selected data entity in n-dimensional space which are located within a threshold syntactic proximity of one or more elements represented by data entities, further comprising:
applying the syntactic vicinity algorithm to a second group of users and elements;
computing the syntactic proximity between the statistical control group and the second group;
using the syntactic proximity and the predictive quantitative or qualitative outcome or an empirical outcome from the statistical control group to project an outcome for the second group.

5. The method of claim 4, wherein the statistical control group comprises a work or labor force distribution of a region, company, sector, or industry, further comprising:
associating a set of metrics or outcomes with the statistical control group;
computing predictions of a set of paths or locations in the underlying system related to the work or labor force distribution of a second region, company, sector, or industry;
wherein a user is associated with the second region, company, sector, or industry;
providing recommendations to the user regarding paths or locations.

6. The method of claim 3, wherein the functional domain is biological, and a plurality of elements are selected from among genes, nucleotides, proteins, molecules, organelles, organs, organ systems, organisms, species, populations, and ecosystems, further comprising using the syntactic proximity as a basis for predicting, recommending, or engineering biological composition, structure, location, relationships, or outcome.

7. The method of claim 3, wherein the functional domain is economic, and a plurality of the elements are selected from among individuals, jobs, skills, products, companies, resources, and activities; further comprising using the syntactic proximity as a basis for predicting, recommending, or engineering economic composition, structure, location, relationships, or outcome.

8. The method of claim 3, wherein the group represents a geographic region, biological system, or grouping of functional assignments,
wherein the functional trajectory represents a developmental path for the geographic region, biological system, or grouping of functional assignments, and
wherein the functional velocity correlates to a growth rate, further comprising computing the predictive functional location as an input to a recommendation engine.

9. The method of claim 2, wherein the functional domain is economic and the syntactic proximity defines a functional distance comprising a mapping from at least two points in at least one dimension in the n-dimensional space to a real number, further comprising:
algorithmically comparing the functional trajectory of a plurality of economic elements based on a set of qualitative, quantitative, geographic, or temporal attributes of the economic elements;
using the functional trajectory as an input to a search, recommendation, matching, or analytical result provided to a user.

10. The method of claim 9, further comprising:
identifying a functional region proximate to the data entity in n+k-dimensional space;
modifying the functional region based on a preference, or from interactions between the data entity and other elements of the functional system;
wherein the functional trajectory or functional velocity of the data entity corresponds to a path in the underlying system or in a digital representation of the underlying system; and providing a set of projections of code sequences, paths, pathways, tags, or metatags for modifying outcomes in the functional system.

11. The method of claim 9, wherein the search or recommendation result relates to economic, financial, or policy objectives, further comprising providing a set of potential or actual economic incentives, tax policies, labor policies, workforce policies, industrial policies, monetary policies, fiscal policies, acquisitions, mergers, divestitures, or investments to a user.

12. The method of claim 9, wherein the search or recommendation result relates to workforce development or labor, further comprising providing a set of career paths, job opportunities, labor distributions, educational distributions, recruitment pools, skill levels, job responsibilities, economic metrics, staffing recommendations, or advertisements to a user.

13. The method of claim 2, further comprising:
assigning k-dimensions in the n+k-dimensional space to temporal, geographic, demographic, biological, genetic, financial, policy or economic data;
wherein the data comprises quantitative, qualitative, textual, visual, aural, audiovisual, tactile information;
computing a predictive functional location in the n-dimensional space based on a set of the k-dimensions.

14. The method of claim 13, further comprising using a word embedding algorithm that renders textual data based on semantic proximity to construct a subset of the n+k dimensional space based on a corpus; and
integrating the semantic proximity and the syntactic proximity to enhance the computation of predictive functional location.

15. The method of claim 13, further comprising:
constructing or augmenting a corpus based on syntactic proximity in n+k dimensional space;
using the corpus to provide or augment the predictive functional location or a search or recommendation result.

16. The method of claim 1, further comprising:
electronically constructing a graph representation of a set of the locations in n-dimensional space by assigning nodes to a set of the parts and processes and edges to a set of the interactions or relationships amongst the parts and processes;
algorithmically computing a graph proximity by executing an algorithm that computes similarity amongst the elements based on strength, quantity, or degree of connection amongst the nodes and the attributes of the nodes in the graph representation; and
algorithmically computing a composite proximity by executing an algorithm that integrates the computed syntactic proximity and output of the graph proximity algorithm;
using the composite proximity to increase the precision or accuracy of the projected location or relationships.

17. The method of claim 16, further comprising:
integrating the graph representation with a second graph representation such that the first graph representation comprises a subgraph;
associating one or more elements with a user;
associating a set of metrics related to syntactic proximity to route the user to alternate paths; and
relating the set of metrics to predicted outcomes in the underlying system.

18. The method of claim 1, further comprising executing a fuzzy query where elements can be identified or matched based on the intersection of two or more functional areas defined by the syntactic proximity of their functional location.

19. A functional connectivity system comprising a computing environment configured to perform a database operation utilizing a computerized representation of a functional system, the system comprising:
an electronic data store comprising a set of data entities in a database system, the data entities representing elements of the functional system, wherein the functional system comprises a group of related elements ordered by their functional roles in converting inputs to outputs, or as the inputs, or as the outputs;
an electronic representation of a systems syntax, wherein the systems syntax comprises a logical data model that can be applied by a computer processor to evaluate or generate expressions of elements, wherein the elements represent parts, processes, and interactions of an underlying system;
at a computer processor coupled to the electronic data store, receiving a set of functional locations from a database, wherein a function represents a conversion from inputs to outputs or a role or property in the conversion from inputs to outputs in the underlying system and a functional location comprises a position of an entity as an input, output, intermediate, relationship, or process associated with inputs, intermediates or outputs;
electronically assigning a set of functional locations to the data entities, the locations based on attributes of the data entities;
algorithmically computing the syntactic proximity among a plurality of the entities or attributes representing the entities based on their functional locations;
wherein the syntactic proximity characterizes a quantitative or qualitative measure of similarity amongst attributes of the elements of the underlying system with respect to the functional locations;
algorithmically computing a projection at a point in time of a location or a relationship associated with one or more of the elements in the underlying system as represented by the data entities, based on the computed syntactic proximity of their functional locations; and
matching and identifying the entities based on the computed syntactic proximity of their functional locations.

20. The system of claim 19, wherein non-functional attributes can be used as an input in the process of identifying or matching of entities, and wherein the functional locations can be identified semantically, syntactically, graphically, symbolically, visually, or aurally;
and wherein non-functional attributes comprise an economic metric, a financial metric, demographic data, geographic data, temporal data, or experiential data.

21. The system of claim 20, wherein the functional system is an economic system, and wherein the data entities comprise enterprises, individuals, products, franchises, facilities, resources, government entities, industries, sectors, independent contractors, or nonprofits, further comprising identifying or matching entities for communication, transaction, advertising, investment, taxation, incentive programs, policy measures, or donation.

22. The system of claim 20, wherein the functional system is an economic system, and wherein the data entities comprise jobs, skills, tasks, workers, workforces, employers, educational institutions, training institutions, and research institutes, further comprising identifying or matching entities for recruiting, job search, hiring, labor policy, workforce development, skill development, training, apprenticeship, coaching, mentorship, management, leadership development, entrepreneurship, incubation, or acceleration.

23. The system of claim 19, wherein the functional system is a biological system, and wherein the data entities comprise genes, nucleotides, genetic sequences, molecules, expressed proteins, biological organisms, organelles, organs, organ systems, species, or populations, further comprising identifying or matching entities for bioinformatic analysis, synthetic genomics, gene editing, or drug discovery.

24. The system of claim 19, wherein the processor is further configured for:
    algorithmically computing a functional trajectory of the data entities based on a relationship of the data entities to reference points in an n-dimensional space or movement of the data entities with respect to the reference points, the trajectory representing a direction associated with a set of paths through functional locations in the n-dimensional space;
    algorithmically computing a functional velocity of the data entities based on a measurement of a change of the location or relationships relative to positions or the reference points at two or more points in time;
    using the functional trajectory and functional velocity as an algorithmic input to improve projective precision or accuracy.

25. The system of claim 19, wherein the processor is further configured for:
    electronically constructing a graph representation of a set of the locations in n-dimensional space by assigning nodes to a set of the parts and processes and edges to a set of the interactions or relationships amongst the parts and processes;
    algorithmically computing a graph proximity by executing an algorithm that computes similarity amongst the elements based on strength, quantity, or degree of connection amongst the nodes and the attributes of the nodes in the graph representation; and
    algorithmically computing a composite proximity by executing an algorithm that integrates the computed syntactic proximity and output of the graph proximity algorithm;
    using the composite proximity to increase the precision or accuracy of the projected location or relationships.

\* \* \* \* \*